(12) United States Patent
Gao et al.

(10) Patent No.: US 12,155,589 B2
(45) Date of Patent: Nov. 26, 2024

(54) METHOD FOR TRANSMITTING INFORMATION ELEMENT, COMMUNICATION NODE, SYSTEM AND STORAGE MEDIUM

(71) Applicant: ZTE Corporation, Guangdong (CN)

(72) Inventors: Bo Gao, Guangdong (CN); Zhaohua Lu, Guangdong (CN); Chuangxin Jiang, Guangdong (CN); Hao Wu, Guangdong (CN); Nan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 465 days.

(21) Appl. No.: 17/152,427

(22) Filed: Jan. 19, 2021

(65) Prior Publication Data
US 2021/0143957 A1 May 13, 2021

Related U.S. Application Data

(63) Continuation of application No. PCT/CN2019/096228, filed on Jul. 16, 2019.

(30) Foreign Application Priority Data

Jul. 18, 2018 (CN) .......................... 201810792802.9

(51) Int. Cl.
*H04W 4/00* (2018.01)
*H04L 5/00* (2006.01)
(Continued)

(52) U.S. Cl.
CPC ........... *H04L 5/0048* (2013.01); *H04W 72/56* (2023.01); *H04W 76/27* (2018.02)

(58) Field of Classification Search
None
See application file for complete search history.

(56) References Cited

U.S. PATENT DOCUMENTS 10,051,478 B2 8/2018 Guo et al.
10,498,511 B2 12/2019 Qin et al.
(Continued)

FOREIGN PATENT DOCUMENTS

CN 105934988 A 9/2016
CN 107347218 A 11/2017
(Continued)

OTHER PUBLICATIONS

Japanese office action issued in JP Patent Application No. 2021-502777, dated Jun. 21, 2022, 6 pages. English translation included.
(Continued)

*Primary Examiner* — Bob A Phunkulh
(74) *Attorney, Agent, or Firm* — Perkins Coie LLP

(57) ABSTRACT

Provided are a method for transmitting an information element, a communication node, a system and a storage medium. The method includes the following steps: a first communication node performs at least one of the following: the first communication node sends capability information to a second communication node; the first communication node receives parameter information of an information element configured by a second communication node; or the first communication node receives a channel characteristic hypothesis of the information element configured by a second communication node; the first communication node determines a manner of receiving the information element according to at least one of the following: the capability information, the parameter information, or the channel characteristic hypothesis of the information element. The information element includes at least one of: Q1 reference signals, Q2 data channels or Q3 control channels, where Q1, Q2 and Q3 are integers greater than or equal to 1.

3 Claims, 6 Drawing Sheets

(51) Int. Cl.
  *H04W 72/56* (2023.01)
  *H04W 76/27* (2018.01)

(56) References Cited

U.S. PATENT DOCUMENTS

| | | | |
|---|---|---|---|
| 11,088,792 B2 | 8/2021 | Zhang et al. | |
| 11,304,184 B2* | 4/2022 | Kang | H04W 72/23 |
| 11,716,231 B1* | 8/2023 | Duan | H04L 5/005 |
| | | | 375/262 |
| 11,736,957 B2* | 8/2023 | Raghavan | H04L 5/0053 |
| | | | 370/329 |
| 11,784,733 B2 | 10/2023 | Gao et al. | |
| 11,901,993 B1* | 2/2024 | Kim | H04W 72/04 |
| 11,924,755 B2* | 3/2024 | Kaikkonen | H04B 7/0695 |
| 2010/0046682 A1 | 2/2010 | Sikri et al. | |
| 2013/0195106 A1 | 8/2013 | Calmon et al. | |
| 2013/0322393 A1* | 12/2013 | Kishiyama | H04L 5/0092 |
| | | | 370/329 |
| 2015/0201369 A1* | 7/2015 | Ng | H04W 48/12 |
| | | | 370/254 |
| 2015/0230220 A1* | 8/2015 | Li | H04W 72/23 |
| | | | 370/329 |
| 2015/0257132 A1 | 9/2015 | Park et al. | |
| 2015/0341914 A1 | 11/2015 | Lee et al. | |
| 2015/0365154 A1* | 12/2015 | Davydov | H04W 72/23 |
| | | | 370/329 |
| 2016/0095093 A1* | 3/2016 | Yi | H04L 5/001 |
| | | | 370/280 |
| 2016/0134408 A1* | 5/2016 | Kim | H04L 5/0048 |
| | | | 370/329 |
| 2017/0078066 A1* | 3/2017 | Park | H04L 1/1861 |
| 2017/0290040 A1 | 10/2017 | Dinan | |
| 2018/0220403 A1* | 8/2018 | John Wilson | H04B 7/0413 |
| 2018/0288737 A1* | 10/2018 | Islam | H04W 72/23 |
| 2018/0324770 A1* | 11/2018 | Nogami | H04L 5/005 |
| 2018/0331727 A1* | 11/2018 | John Wilson | H04W 72/046 |
| 2019/0141691 A1* | 5/2019 | Kwon | H04W 72/046 |
| 2019/0253904 A1* | 8/2019 | Tsai | H04W 16/14 |
| 2020/0015200 A1* | 1/2020 | Vilaipornsawai | H04W 72/23 |
| 2020/0021976 A1* | 1/2020 | Shimezawa | H04W 68/005 |
| 2020/0037293 A1* | 1/2020 | Reial | H04W 48/08 |
| 2020/0059277 A1* | 2/2020 | Su | H04L 5/0023 |
| 2020/0092063 A1* | 3/2020 | Baldemair | H04W 72/23 |
| 2020/0177262 A1* | 6/2020 | Chen | H04B 7/088 |
| 2020/0252192 A1 | 8/2020 | Gao et al. | |
| 2020/0280416 A1 | 9/2020 | Gao et al. | |
| 2020/0359448 A1* | 11/2020 | Takeda | H04L 5/10 |
| 2021/0076324 A1* | 3/2021 | Kaikkonen | H04W 52/0274 |
| 2021/0235453 A1* | 7/2021 | Matsumura | H04W 72/0446 |
| 2021/0250981 A1* | 8/2021 | Takeda | H04W 72/1273 |
| 2021/0258809 A1* | 8/2021 | Gao | H04L 5/0057 |
| 2021/0359746 A1* | 11/2021 | Tidestav | H04B 7/088 |
| 2023/0371123 A1* | 11/2023 | Lee | H04L 1/1812 |
| 2024/0049022 A1* | 2/2024 | Ibrahim | H04B 1/54 |
| 2024/0073938 A1* | 2/2024 | Goyal | H04W 72/54 |

FOREIGN PATENT DOCUMENTS

| | | |
|---|---|---|
| CN | 107889150 A | 4/2018 |
| CN | 108024365 A | 5/2018 |
| CN | 108092754 A | 5/2018 |
| CN | 108111276 A | 6/2018 |
| CN | 108111286 A | 6/2018 |

OTHER PUBLICATIONS

Korean office action issued in KR Patent Application No. 10-2021-7004516, dated Dec. 15, 2022, 6 pages. English translation included.
International Search Report and Written Opinion for International Application No. PCT/CN2019/096228, mailed on Sep. 16, 2019, 6 pages.
Korean office action issued in KR Patent Application No. 10-2021-7004516, dated Jun. 19, 2023, 6 pages. English translation included.
Ericsson, "Maintenance for beam management," 3GPP TSG-RAN WG1 Meeting #95, Tdoc R1-1813249, Spokane, USA, Nov. 12-16, 2018, 5 pages.
Japanese office action issued in JP Patent Application No. 2022-148946, dated Jun. 27, 2023, 4 pages. English translation included.
Ericsson, "Remaining details of beam management," 3GPP TSG-RAN WG1 #91, R1-1720730, Reno, USA, Nov. 27-Dec. 1, 2017, 11 pages.
Supplementary European Search Report for EP Patent Application No. 19837144.5, dated Jul. 27, 2021, 10 pages.
Intel Corporation: 11 Summary of offline on simultaneous transmission and reception of channels/signals 11, 3GPP Draft; R1-1807818, 3GPP, Mobile Competence Centre; 650, Route Des Lucioles; F-06921 Sophia-Antipolis Cedex; France vol. RAN WG1, No. Busan, Korea; May 21, 2018-May 25, 2018 May 24, 2018 (May 24, 2018), XP051463426, Retrieved from the Internet: URL:http://www.3gpp.org/ftp/tsg%5Fran/WG1%5FRL1/TSGR1%5F93/Docs [retrieved on May 24, 2018].
Catt: 11 On multiplexing of signals and physical channels 11, 3GPP Draft; R1-1803741, 3GPP, Mobile Competence Centre; 650, Route Des Lucioles; F-06921 Sophia-Antipolis Cedex; France vol. RAN WG1, No. Sanya, China; Apr. 16, 2018-Apr. 20, 2018 Apr. 15, 2018 (Apr. 15, 2018), XP051426036, Retrieved from the Internet: URL:http://www.3gpp.org/ftp/Meetings%5F3GPP%5FSYNC/RAN1/Docs/ [retrieved on Apr. 15, 2018].
ZTE: "Simultaneous transmission and reception of different channels and reference signals", 3GPP Draft; R1-1805830 Simultaneous TX and RX of Different Channels and Signals Final, 3GPP, Mobile Competence Centre; 650, Route Des Lucioles ; F-06921 Sophia-An vol. RAN WG1, No. Busan, Korea; May 21, 2018-May 25, 2018 May 20, 2018 (May 20, 2018), XP051441050, Retrieved from the Internet: URL:http://www.3gpp.org/ftp/Meetings%5F3GPP%5FSYNC/RAN1/Docs/ [retrieved on May 20, 2018].
Indonesian office action issued in ID Patent Application No. P00202101188, dated Mar. 9, 2023, 6 pages. English translation included.
Qualcomm Incorporated, "Remaining Details on QCL," 3GPP TSG-RAN WG1 Meeting #93, R1-1807398, Busan, Korea, May 21-25, 2018, 11 pages.
3GPP TS 38.214, V15.2.0, (Jun. 6, 2018), Technical Specification, 3rd Generation Partnership Project, Technical Specification Group Radio Access Network, NR, Physical layer procedures for data, (Release 15), 7 pages.
Chinese office action issued in CN Patent Application No. 202110758388.1, dated Sep. 26, 2023, 11 pages. English translation included.
Japanese notice of allowance issued in JP Patent Application No. 2022-148946, dated Oct. 18, 2023, 3 pages. English translation included.
Chinese office action issued in CN Patent Application No. 201810792802.9, dated Dec. 21, 2023, 11 pages. English translation included.
Korean notice of allowance issued in KR Patent Application No. 10-2021-7004516, dated Dec. 26, 2023, 8 pages. English translation included.
Chinese office action issued in CN Patent Application No. 202110758388.1, dated Jan. 23, 2024, 6 pages. English translation included.
Chinese Notification to Complete Formalities of Registration issued in CN Patent Application No. 201810792802.9, dated May 16, 2024, 7 pages. English translation included.
Vivo, "Remaining issues on simultaneous reception of DL/UL physical channels and reference signals," 3GPP TSG RAN WG1 Meeting #93, R1-1806047, Busan, Korea, May 21-25, 2018, 7 pages.
Chinese Notification to Complete Formalities of Registration issued in CN Patent Application No. 202110758388.1, dated May 9, 2024, 4 pages. English translation included.

* cited by examiner

METHOD FOR TRANSMITTING INFORMATION ELEMENT, COMMUNICATION NODE, SYSTEM AND STORAGE MEDIUM

CROSS-REFERENCE TO RELATED APPLICATIONS

This application is a continuation of International Patent Application No. PCT/CN2019/096228, filed on Jul. 16, 2019, which claims priority to Chinese Patent Application No. 201810792802.9, filed on Jul. 18, 2018, the contents of each of which are incorporated herein by reference in their entireties.

TECHNICAL FIELD

Embodiments of the present disclosure relate to, but are not limited to, the field of communications, and, in particular, to a method for transmitting an information element, a communication node, system and a storage medium.

BACKGROUND

High-frequency band communications (i.e. millimeter wave communications) with ultra-wide bandwidths become an important development trend of mobile communications in the future and attract the attention of the global academia and industry. The advantages of the millimeter wave communications become increasingly attractive under the condition of increasingly congested spectrum resources and a huge number of accesses to Internet of Things in the present. Corresponding standardization efforts have been started in many standard organizations such as an Institute of Electrical and Electronics Engineers (IEEE) and a 3rd Generation Partnership Project (3GPP). For example, in 3GPP standard groups, high-frequency band communications will become an important innovation of a 5th Generation (5G) New Radio Access Technology (New RAT) with its significant advantage of large-wide bandwidths.

At present, multiple antenna panels may exist in a base station, each antenna panel may generate multiple beams, and a similar case exists for a user equipment (UE). In the related 5G communication system, at the same amount, it is assumed that analog beams do not collide. However, with the increase of the UE and centralized antenna panels, channels and reference signals with different channel characteristic hypotheses may be sent simultaneously under different antenna panels, which causes the channels or reference signals to collide. At present, there is no effective method to solve the problem of receiving the channels or reference signals when the channel characteristics hypotheses of the channels or the reference signals of the multi-antenna panel collide.

SUMMARY

Embodiments of the present disclosure provide a method for transmitting an information element, a communication node, a system and a storage medium, which can improve the receiving flexibility of the information element of a multi-antenna panel, thereby improving the system performance.

An embodiment of the present disclosure provides a method for transmitting an information element. The method includes steps described below.

A first communication node performs at least one of the following: the first communication node sends capability information to a second communication node; the first communication node receives parameter information of an information element configured by a second communication node; or the first communication node receives a channel characteristic hypothesis of the information element configured by a second communication node.

The first communication node determines a manner of receiving the information element according to at least one of the following: the capability information, the parameter information, or the channel characteristic hypothesis of the information element.

The information element includes at least one of: Q1 reference signals, Q2 data channels or Q3 control channels.

Q1, Q2 and Q3 are integers greater than or equal to 1.

An embodiment of the present disclosure further provides a method for transmitting an information element. The method includes steps described below.

A second communication node performs at least one of the following: the second communication node receives capability information sent by a first communication node; the second communication node sends parameter information of an information element to the first communication node; or the second communication node sends a channel characteristic hypothesis of the information element to the first communication node.

The second communication node sends the information element.

The information element includes at least one of: a reference signal, a data channel or a control channel.

An embodiment of the present disclosure further provides a communication node. The communication node includes a communication module and a determination module.

The communication module is configured to perform at least one of the following: sending capability information to a second communication node; receiving parameter information of an information element configured by a second communication node; or receiving a channel characteristic hypothesis of the information element configured by a second communication node.

The determination module is configured to determine a manner of receiving the information element according to at least one of the following: the capability information, the parameter information, or the channel characteristic hypothesis of the information element.

The information element includes at least one of: Q1 reference signals, Q2 data channels or Q3 control channels.

Q1, Q2 and Q3 are integers greater than or equal to 1.

An embodiment of the present disclosure further provides a communication node. The communication node includes a communication module and a sending module.

The communication module is configured to perform at least one of the following: receiving capability information sent by a first communication node; sending parameter information of an information element to the first communication node; or sending a channel characteristic hypothesis of the information element to the first communication node.

The sending module is configured to send the information element.

The information element includes at least one of: Q1 reference signals, Q2 data channels or Q3 control channels.

Q1, Q2 and Q3 are integers greater than or equal to 1.

An embodiment of the present disclosure further provides a communication node, including a processor and a computer-readable storage medium, where the computer-readable storage medium stores an instruction, and the instruction, when executed by the processor, implements any one of the methods for transmitting the information element described above.

An embodiment of the present disclosure further provides a computer-readable storage medium. The computer-readable storage medium stores a computer program, where the computer program, when executed by a processor, implements the steps of any one of the methods for transmitting the information element described above.

An embodiment of the present disclosure further provides a system for transmitting an information element. The system includes a first communication node and a second communication node.

The first communication node is configured to perform at least one of the following: sending capability information to a second communication node, receiving parameter information of an information element configured by a second communication node, or receiving a channel characteristic hypothesis of the information element configured by a second communication node; and determine a manner of receiving the information element according to at least one of the following: the capability information, the parameter information, or the channel characteristic hypothesis of the information element.

The second communication node is configured to perform at least one of the following: receiving the capability information sent by the first communication node, sending the parameter information of the information element to the first communication node, or sending the channel characteristic hypothesis of the information element to the first communication node; and send the information element.

The information element includes at least one of: Q1 reference signals, Q2 data channels or Q3 control channels. Q1, Q2 and Q3 are integers greater than or equal to 1.

In the embodiments of the present disclosure, the first communication node performs at least one of the following: the first communication node sends the capability information to the second communication node; the first communication node receives the parameter information of the information element configured by the second communication node; or the first communication node receives the channel characteristic hypothesis of the information element configured by the second communication node; and the first communication node determines the manner of receiving the information element according to at least one of the following: the capability information, the parameter information, or the channel characteristic hypothesis of the information element. The information element includes at least one of: Q1 reference signals, Q2 data channels or Q3 control channels, where Q1, Q2 and Q3 are integers greater than or equal to 1. In the embodiments of the present disclosure, the manner of receiving the information element is determined according to at least one of the following: the capability information, the parameter information, or the channel characteristic hypothesis of the information element, so as to improve the receiving flexibility of the information element of the multi-antenna panel, and improve the resource utilization efficiency of the antenna panel, thereby improving the system performance.

DETAILED DESCRIPTION

Embodiments of the present disclosure will be described in detail below in conjunction with the drawings. It is to be noted that if not in collision, the embodiments and characteristics therein in the present disclosure may be combined with each other in any way.

The steps illustrated in the flowcharts among the drawings may be executed in, for example, a computer system containing a group of computer-executable instructions. Moreover, although logical sequences are illustrated in the flowcharts, the illustrated or described steps may be performed in sequences different from those described herein in some cases.

Figure 1:
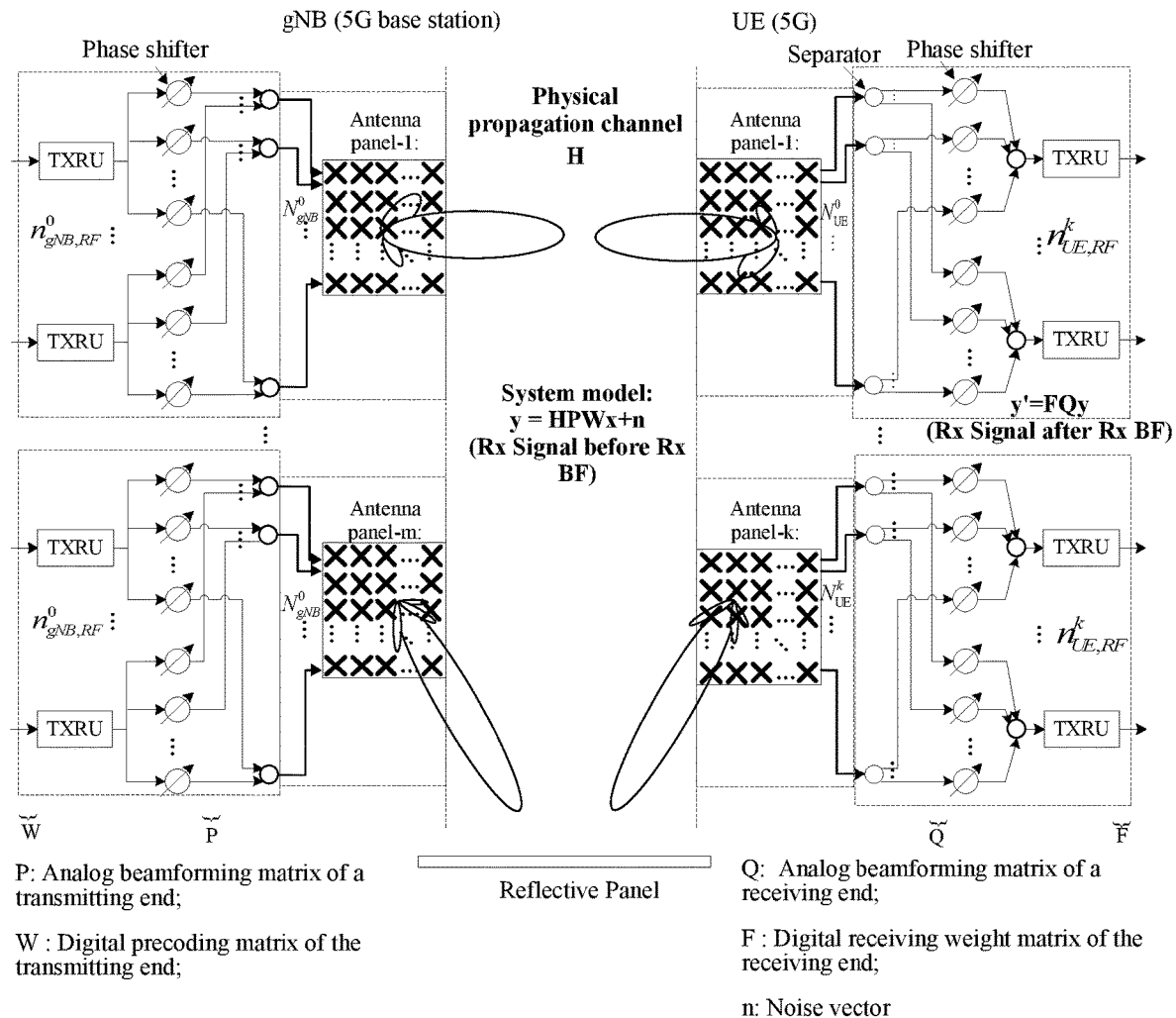
FIG. 1 is a structural diagram of a hybrid pre-coding (hybrid analog and digital beamforming) transceiver according to an embodiment of the present disclosure.

FIG. 1 is a structural diagram of a hybrid pre-coding (hybrid analog and digital beamforming) transceiver according to an embodiment of the present disclosure. As shown in FIG. 1, a transmitting end and a receiving end are configured with multiple antenna array units (i.e. antenna panels or antenna units) respectively, each antenna panel includes multiple transmit receive antennas and is interconnected (which does not exclude a scenario of partial connection) with multiple radio frequency links (i.e. Transmit Receive Units (TXRUs)), and digital keying phase shifters is provided between the antenna panel and the TXRUs.

A high-frequency band system implements beamforming of an analog end by loading different phase shifts on signals of the antenna panels. Specifically, at the transmitting end, multiple radio frequency signal streams exist in a radio frequency link, where each radio frequency signal stream is loaded with an antenna weight vector (AWV) via the digital keying phase shifter, the radio frequency signals after being loaded with the AWVs are weighted and combined into a single radio frequency signal stream by a combiner, and the single radio frequency signal stream is sent from the multi-antenna panel to a high-frequency band physical propagation channel. At the receiving end, a radio frequency signal stream received by a multi-antenna panel is separated through a separator to obtain separated signals, the separated signals are multiplied by the AWVs of the receiving end through the digital keying phase shifter to obtain new signals, and the obtained new signals are weighted and combined into a single radio frequency signal stream through the combiner. After radio frequency demodulation at the receiving end, a receiver finally obtains multiple received radio frequency signal streams, which are sampled and received by a digital baseband. Therefore, the hybrid pre-coding (hybrid analog and digital beamforming) transceiver may simultaneously generate radio frequency beams in multiple directions.

At the same time, the transmitting end and the receiving end may include multiple antenna panels to better support space division multiplex and reduce the complexity of the implementation of hardware. Therefore, under each antenna panel, the number of effective beams is asymmetric to the maximum number of transmit beams that actually can be supported, that is, the number of beams that can be sent at each moment, i.e. the number of TXRUs, is much less than the number of optional beams.

Figure 2:
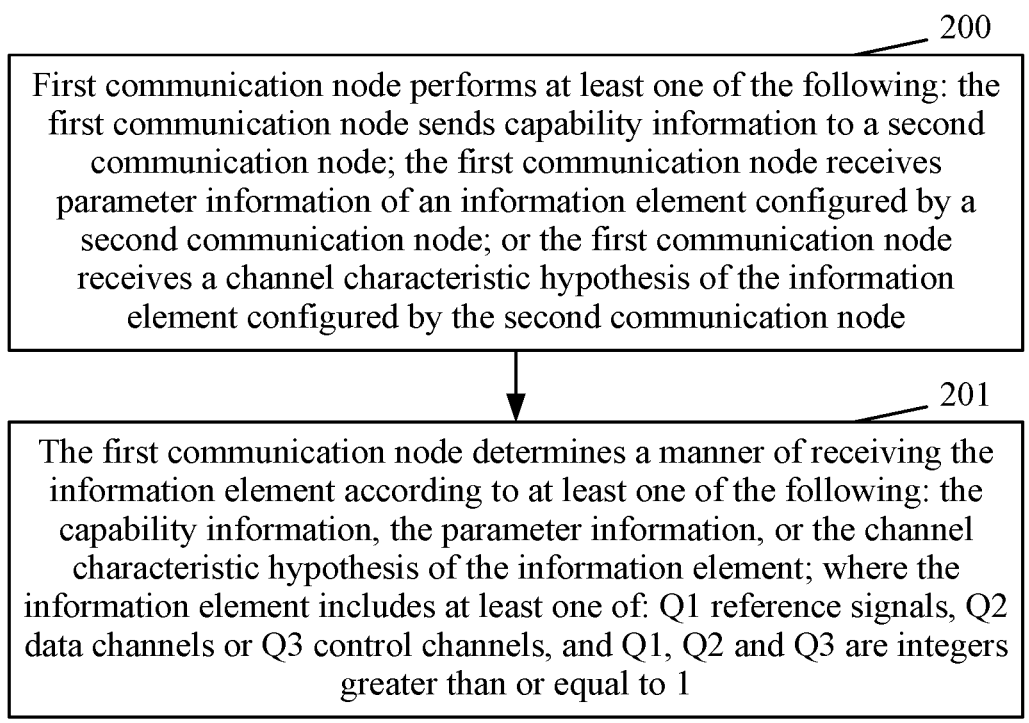
FIG. 2 is a flowchart of a method for transmitting an information element according to an embodiment of the present disclosure.

Referring to FIG. 2, an embodiment of the present disclosure provides a method for transmitting an information element, and the method includes steps described below.

In step 200, a first communication node performs at least one of the following: the first communication node sends capability information to a second communication node; the first communication node receives parameter information of an information element configured by the second communication node; or the first communication node receives a channel characteristic hypothesis of the information element configured by the second communication node.

In an embodiment of the present disclosure, the capability information includes at least one of the following: a first type of information R1, a second type of information R2 or a third type of information.

The parameter information includes at least one of the following: a fourth type of information T1, or a fifth type of information T2.

The first type of information, the second type of information, the third type of information, the fourth type of information and the fifth type of information are described below respectively.

In the embodiment of the present disclosure, a reference signal resource refers to a sum of a time domain resource, a frequency domain resource and a code domain resource which are associated with a reference signal.

A channel includes at least one of the following: a data channel or a control channel.

(1) The first type of information R1 includes at least one of the following: the number of $A^{th}$-type packets; the number of $A^{th}$-type packets of the first communication node, that is, the number of $A^{th}$-type packets in the first communication node; the number or the maximum number of reference signals within a first-type packet in a channel state information report; the number or the maximum number of second-type packets in a channel state information report; the number or the maximum number of third-type packets in a channel state information report; the number or the maximum number of at least one of the following which is sent simultaneously: uplink reference signal resources or uplink channels; the number or the maximum number of at least one of the following which is received simultaneously: downlink reference signal resources or downlink channels; the number or the maximum number of channel characteristic hypotheses of at least one of the following which is received simultaneously: downlink reference signal resources or downlink channels; the number or the maximum number of different channel characteristic hypotheses of at least one of the following which is received simultaneously: downlink reference signal resources or downlink channels, or the number or the maximum number of downlink information elements having different channel characteristic hypotheses and received simultaneously; the number or the maximum number of channel characteristic hypotheses that may be configured by a reference signal resource or a reference signal resource set; the number or the maximum number of one of the following: reference signal resource sets, reference signal resource sets for a beam management, reference signal resource sets for a reference signal receiving power (RSRP) report, reference signal resource sets for a reference signal receiving quality (RSRQ) report, reference signal resource sets for a signal to interference plus noise ratio (SINR) report, or reference signal resource sets configured with repetition signaling; the number or the maximum number of demodulation reference signal (DMRS) port groups, or the number or the maximum number of demodulation reference signal port groups in a joint transmission mode; or the number or the maximum number of combinations of control resource sets (CORESETs) of a PDCCH.

The uplink reference signal includes at least one of the following: a sounding reference signal (SRS), a phase-tracking reference signal (PT-RS) or a DMRS.

The downlink reference signal includes at least one of the following: a channel state information reference signal (CSI-RS), a downlink phase-tracking reference signal, a synchronization signal block (SSB), a synchronization signal/physical broadcast channel (SS/PBCH), a downlink demodulation reference signal or a CSI-RS for tracking.

Specifically, the first type of information represents the number of panels of the first communication node, or the number of antenna groups, or the number of information elements which may be received or sent simultaneously.

(2) The second type of information R2 includes at least one of the following: the number of $B^{th}$-type packets under one $A^{th}$-type packet; the number of $B^{th}$-type packets under one $A^{th}$-type packet of the first communication node; or the number or the maximum number of reference signals, which are received simultaneously, within one third-type packet in a channel state information report.

Specifically, the second type of information represents the number of sub-panels under each panel of the first communication node, or the number of sub-antenna groups under an antenna group, or the number of information elements which may be received or sent simultaneously under one antenna panel. For example, one antenna panel includes two sub-panels, therefore, one antenna panel may receive two different information elements.

(3) The three type of information includes at least one of the following: capability information of receiving downlink information elements simultaneously, where the specific value may be that supporting receiving downlink information elements simultaneously or not supporting receiving downlink information elements simultaneously; capability information of a multi-transmission node transmission mode, where the specific value may be that supporting the multi-transmission node transmission mode or not supporting the multi-transmission node transmission mode; or capability information of supporting a joint transmission mode, where the specific value may be that supporting the joint transmission mode or not supporting the joint transmission mode; or capability information of a direct communication, where the specific value may be that supporting the direct communication or not supporting the direct communication; capability information of a mode of multiple demodulation reference signal port groups, where the specific value may be that supporting the mode of the multiple demodulation reference signal port groups or not supporting the mode of the multiple demodulation reference signal port groups; capability information of multiple combinations of control resource sets of physical downlink control channels, where the specific value may be that supporting the multiple combinations of the control resource sets of the physical downlink control channels or not supporting the multiple combinations of the control resource sets of the physical downlink control channels; or capability information of a packet report, where the specific value may be that supporting the packet report or not supporting the packet report.

Specifically, the third type of information represents whether the first communication node can support the capability information of receiving information elements simultaneously, or represents whether the capability of receiving information elements simultaneously is supported in an implicit form. Further, if the first communication node sends the third type of information to represent "support", the number of antenna groups may be represented to be a default, such as to be 2; otherwise, it is represented that the number of antenna groups is 1 by default.

(4) The fourth type of information T1 includes at least one of the following: the number of $A^{th}$-type packets; the number of $A^{th}$-type packets of the second communication node; the number or the maximum number of channel characteristic hypotheses of downlink information elements which are sent simultaneously, or the number or the maximum number of different channel characteristic hypotheses of downlink information elements which are sent simultaneously; the number or the maximum number of downlink information elements which are sent simultaneously, or the number or the maximum number of downlink information elements having different channel characteristic hypotheses and sent simultaneously; the number or the maximum number of downlink information elements which are processed simultaneously; the number or the maximum number of channel characteristic hypotheses associated with downlink information elements which are processed simultaneously; the number or the maximum number of different channel characteristic hypotheses of downlink information elements which are processed simultaneously; the number or the maximum number of downlink information elements having different channel characteristic hypotheses and processed simultaneously; the number or the maximum number of reference signals within a first-type packet in a channel state information report, or the number or the maximum number of reference signals, which are from a same reference signal resource set or in a same reference signal configuration, within a first-type packet in a channel state information report; the number or the maximum number of second-type packets in a channel state information report, or the number or the maximum number of second-type packets, which contain reference signals in a same reference signal resource set or in a same reference signal configuration, in a channel state information report; the number or the maximum number of third-type packets in a channel state information report, or the number or the maximum number of third-type packets, which contain reference signals in a same reference signal resource set or in a same reference signal configuration, in a channel state information report; the number or the maximum number of demodulation reference signal port groups, or the number or the maximum number of demodulation reference signal port groups in a joint transmission mode; the number or the maximum number of combinations of control resource sets of a PDCCH; or the number of resource groups of a direct communication.

The above processed includes one of: received, monitored or measured.

Specifically, the fourth type of information represents the number of antenna panels of the second communication node or the number of antenna groups of the second communication node, or the number of information elements configured to the first communication node that need to be received simultaneously in subsequent transmissions according to the capability of the second communication node and the capability of the first communication node.

(5) The fifth type of information T2 includes at least one of the following: the number of $B^{th}$-type packets under one $A^{th}$-type packet or the number of $B^{th}$-type packets under one $A^{th}$-type packet of the second communication node; or the number or the maximum number of reference signals, which are received simultaneously, within a third-type packet in a channel state information report, or the number or the maximum number of reference signals, which are from a same reference signal set or in a same reference signal configuration, within a third-type packet in a channel state information report.

A characteristic of the first-type packet includes at least one of the following: reference signals within the packet may be received simultaneously; or reference signals of packets may not be received simultaneously, or different reference signals of packets may not be received simultaneously.

A characteristic of the second-type packet includes at least one of the following: reference signals of packets may be received simultaneously; or reference signals within the packet may not be received simultaneously, or different reference signals within the packet may not be received simultaneously.

A characteristic of the third-type packet includes at least one of the following: reference signals of packets may be received simultaneously; no more than F reference signals within the packet may be received simultaneously, or no more than F different reference signals within the packet may be received simultaneously; or more than F reference signals within the packet may not be received simultaneously, or more than F different reference signals within the packet may not be received simultaneously; where F is a positive integer greater than or equal to 1.

The $A^{th}$-type packet includes one of a panel or an antenna array. Further, the panel may also be referred as an antenna panel.

A characteristic of the $A^{th}$-type packet includes at least one of the following: information elements respectively associated with different packets may be sent simultaneously; information elements respectively associated with different packets may be received simultaneously; information elements associated with a same packet may not be sent simultaneously, or information elements having different channel characteristic hypotheses and associated with a same packet may not be sent simultaneously; information elements associated with a same packet may not be received simultaneously, or information elements having different channel characteristic hypotheses and associated with a same packet may not be received simultaneously; no more than E information elements associated with a same packet may be sent simultaneously, or no more than E information elements having different channel characteristic hypotheses and associated with a same packet may be sent simultaneously; more than E information elements associated with a same packet may not be sent simultaneously, or more than E information elements having different channel characteristic hypotheses and associated with a same packet may not be sent simultaneously; no more than E information elements associated with a same packet may be received simultaneously, or no more than E information elements having different channel characteristic hypotheses and associated with a same packet may be received simultaneously; more than E information elements associated with a same packet may not be received simultaneously, or more than E information elements having different channel characteristic hypotheses and associated with a same packet may not be received simultaneously; or E $B^{th}$-type packets are included in the packet, where E is a positive integer greater than or equal to 1.

A characteristic of the $B^{th}$-type packet includes at least one of the following: information elements respectively associated with different packets may be sent simultaneously; information elements respectively associated with different packets may be received simultaneously; information elements associated with a same packet may not be sent simultaneously, or information elements having different channel characteristic hypotheses and associated with a same packet may not be sent simultaneously; or information elements associated with a same packet may not be received simultaneously, or information elements having different channel characteristic hypotheses and associated with a same packet may not be received simultaneously.

Specifically, the fifth type of information represents the number of sub-panels under each panel of the second communication node, or the number of sub-antenna groups under an antenna group, or determining the number of sub-panels under each panel of the first communication node, or that the number of sub-antenna groups under the antenna group may be used for a data transmission that supports multiple beams.

In an embodiment of the present disclosure, the channel characteristic hypothesis includes at least one of the following: a quasi co-location (QCL), a spatial parameter, a spatial QCL, a transmission configuration indication (TCI) state, spatial filter information, antenna group information or a reference RS set.

The quasi co-location is composed of at least one reference signal (RS) and a quasi co-location parameter associated with the at least one reference RS, where the quasi co-location parameter includes at least one of: Doppler spread, Doppler shift, delay expansion, average delay, average gain or a spatial parameter. The spatial parameters may include a spatial receive parameter, such as an angle of arrival, a spatial correlation of a receive beam, the average delay and a correlation (including phase information) of a time-frequency channel response.

Alternatively, the quasi co-location is composed of at least one reference RS set, and each reference RS set includes at least one reference RS and the quasi co-location parameter associated with the at least one reference RS.

The spatial filter information may be spatial filter configuration information that the second communication node (such as a base station) expects the first communication node (such as a UE) to implement, or may be spatial filter configuration information of the second communication node.

In the embodiment of the present disclosure, the channel characteristic hypotheses being different may means that only the difference of the spatial parameters is considered, that is, if two RSs are included in a TCI, only whether RSs associated with a spatial parameter are the same is considered as a criterion for determining whether the channel characteristic hypotheses are the same. That is, whether the channel characteristic hypotheses are the same is determined according to whether the RSs associated with the same spatial parameter are the same. When the RSs associated with the same spatial parameter are the same, it is determined that the channel characteristic hypotheses are the same; when the RSs associated with the same spatial parameter are different, it is determined that the channel characteristic hypotheses are different.

In the embodiment of the present disclosure, the beam may be a resource (e.g., a transmitting-end spatial filter, a receiving-end spatial filter, a transmitting-end pre-coding, a receiving-end pre-coding, an antenna port, an antenna weight vector and an antenna weight matrix). Since the beam may be bound to some time-frequency code resources for transmission, a beam sequence number may be replaced with a resource index (e.g., a reference signal resource index).

The beam may also be a transmission (sending or receiving) manner. The transmission manner may include spatial division multiplexing, frequency domain diversity, time domain diversity or the like.

The number of reference signals may be one of: the number of reference signal resources, the number of reference signal resource indexes or the number of beams.

In step 201, the first communication node determines a manner of receiving the information element according to at least one of the following: the capability information, the parameter information, or the channel characteristic hypothesis of the information element; where the information element includes at least one of: Q1 reference signals, Q2 data channel or Q3 control channels, and Q1, Q2 and Q3 are integers greater than or equal to 1.

In an embodiment of the present disclosure, a characteristic of the information element includes at least one of the following: transmitted simultaneously; sent by the second communication node simultaneously; received by the first communication node simultaneously; or associated with a same time unit, or the associated time units partially or completely overlap; where the time unit includes at least one of the following: an orthogonal frequency division multiplexing (OFDM) symbol, a sub-OFDM symbol, or a slot.

In an embodiment of the present disclosure, the manner of receiving the information element is determined in the case where a preset condition is satisfied by at least one of the following: the capability information, the parameter information, or the configured channel characteristic hypothesis of the information element.

In the case where the preset condition is satisfied by at least one of the following: the capability information, the parameter information, or the configured channel characteristic hypothesis of the information element, it indicates that the channel characteristic hypotheses of the information elements collide, and the manner of receiving the information element needs to be re-determined.

The preset condition includes at least one of the following: the number of different channel characteristic hypotheses of information elements is greater than a first-type threshold, that is, the number of different channel characteristic hypotheses configured for the information elements is greater than the first-type threshold; or the number of channel characteristic hypotheses of information elements is greater than a first-type threshold, or the number of information elements is greater than a first-type threshold; a first-type parameter associated with the information element is greater than a second-type threshold; a second-type parameter associated with the information element is greater than a third-type threshold; or a third-type parameter associated with the information element is greater that a fourth-type threshold.

A third-type of information includes at least one of the following: supporting receiving downlink information elements simultaneously, supporting a multi-transmission node transmission mode, supporting a joint transmission mode, supporting a mode of multiple demodulation reference signal port groups, supporting a packet report, supporting a direct communication, or supporting combining control resource sets of multiple physical downlink control channels.

The first-type threshold or the second-type threshold or the third-type threshold or the fourth-type threshold is determined according to at least one of: the capability information or the parameter information.

The first-type threshold or the second-type threshold or the third-type threshold or the fourth-type threshold includes at least one of the following: 1, 2, 3, 4, a first type of information, a second type of information, a fourth type of information, a fifth type of information, a product of a first type of information and a second type of information, or a product of a fourth type of information and a fifth type of information.

Alternatively, the preset condition includes at least one of the following: the number of information elements is greater than a fifth-type threshold, or the number of different channel characteristic hypotheses of information elements is greater than a fifth-type threshold, or the number of channel characteristic hypotheses of information elements is greater than a fifth-type threshold; a third type of information includes at least one of the following: not supporting receiving downlink information elements simultaneously, not supporting a multi-transmission node transmission mode, not supporting a joint transmission mode, not supporting a mode of multiple demodulation reference signal port groups, not supporting a packet report, not supporting a direct communication, or not supporting combing control resource sets of multiple physical downlink control channels; a third type of information is default or null, that is, a field used for representing the third type of information does not contain any information; a third type of information is not sent; where the fifth-type threshold includes at least one of 1, 2, 3 or 4.

For example, from the perspective of the first communication node, the capability information of multiple antenna panels or multiple instrument panels supported by the first communication node is sent to the second communication node, and a determination criterion of a collision needs to be based on a per UE antenna group (UAG), that is, when a same UAG and different transmit beams (Tx beams) are called, the collision is defined; when different UAGs and the same or different Tx beams are called, the collision is not defined.

The UAG refers to a class of antenna panels having the same characteristics.

From the perspective of the receiving end, the UAG is defined as the following: in one UAG, only one down link reference signal (DL RS) or no more than P different DL RSs may be received simultaneously; in different UAGs, multiple different DL RSs may be received simultaneously.

From the perspective of the transmitting end, the UAG is defined as the following: in one UAG, only one DL RS or no more than P different DL RSs may be sent simultaneously; in different UAGs, multiple different DL RSs may be sent simultaneously; where P is an integer greater than or equal to 1. As a basic capability unit, one UE may be divided into multiple UAGs.

The step of determining the manner of receiving the information element includes performing, according to a priority criterion, at least one of the following: replacing a channel characteristic hypothesis of a low-priority information element by a specific channel characteristic hypothesis, or receiving a low-priority information element by using a specific channel characteristic hypothesis; receiving a high-priority information element, or not receiving a low-priority information element; or removing a low-priority information element.

In a specific implementation process, in the case where three or more information elements satisfy a preset condition, it may be implemented by using a manner of loop iteration, that is, when it is determined that an information element satisfies the preset condition, a manner of receiving the lowest-priority information element is determined; it continues to determine whether an information element satisfies the preset condition, and when it is determined that the information element satisfies the preset condition, a manner of receiving a second lowest-priority information element is determined; it continues to determine whether an information element satisfies the preset condition, and when it is determined that the information element satisfies the preset condition, a manner of receiving a third lowest-priority information element is determined; and so on until an information element does not satisfy the preset condition.

The above four cases that information elements satisfy the preset condition are respectively described below.

(One) The number X of different channel characteristic hypotheses of information elements is greater than the first-type threshold.

For example, the second communication node uses a same OFDM symbol to send multiple information elements, but the information elements have different channel characteristic hypotheses.

In this case, a specific channel characteristic hypothesis includes at least one of the following: a pre-configured channel characteristic hypothesis; a channel characteristic hypothesis associated with a preset index satisfying a first predetermined condition; or a channel characteristic hypothesis of a primary carrier; or a channel characteristic hypothesis of a high-priority information element. In the actual implementation, first, a channel characteristic hypothesis of the highest-priority information element is used for replacing, then, a channel characteristic hypothesis of a second highest-priority information element is used for replacing, and so on.

The preset index satisfying the first predetermined condition includes one of the following: lowest N preset indexes, highest N preset indexes or specific N preset indexes.

The preset index includes at least one of the following: a carrier index, a bandwidth part (BWP) index, a control resource set index, or a control channel resource index; and N is a positive integer greater than or equal to 1.

(Two) A first-type parameter Y1 associated with the information element is greater than the second-type threshold.

In this case, the first-type parameter includes the number of first-type packets associated with an information element, or the number of different first-type packet indexes associated with an information element.

In this case, the specific channel characteristic hypothesis includes at least one of the following: a pre-configured channel characteristic hypothesis; a pre-configured channel characteristic hypothesis of a first-type packet index associated with the low-priority information element; a channel characteristic hypothesis associated with a preset index, which satisfies a first predetermined condition, in preset indexes satisfying a second predetermined condition; or a channel characteristic hypothesis of the high-priority information element.

The preset index satisfying the first predetermined condition includes one of the following: lowest N preset indexes, highest N preset indexes or specific N preset indexes.

The preset indexes satisfying the second predetermined condition include a preset index associated with a first-type packet index associated with the low-priority information element.

The preset index includes at least one of the following: a carrier index, a bandwidth part index, a control resource set index, or a control channel resource index; and N is a positive integer greater than or equal to 1.

(Three) A second-type parameter Y2 associated with the information element is greater than the third-type threshold.

In this case, the second-type parameter includes at least one of the following: the number or the maximum number of information elements of a same $A^{th}$-type packet index of the first communication node; the number or the maximum number of channel characteristic hypotheses of a same $A^{th}$-type packet index of the first communication node, where the same $A^{th}$-type packet index is associated with information elements; the number or the maximum number of different channel characteristic hypotheses of a same $A^{th}$-type packet index of the first communication node, where the same $A^{th}$-type packet index is associated with information elements; the number or the maximum number of information elements of a same second-type packet index, or the number or the maximum number of channel characteristic hypotheses of a same second-type packet index associated with information elements, or the number or the maximum number of different channel characteristic hypotheses of a same second-type packet index associated with information elements; or the number or the maximum number of information elements of a same third-type packet index, or the number or the maximum number of channel characteristic hypotheses of a same third-type packet index associated with information elements, or the number or the maximum number of different channel characteristic hypotheses of a same third-type packet index associated with information elements.

In this case, the specific channel characteristic hypothesis may be one of the following.

(1) The specific channel characteristic hypothesis includes at least one of the following: a pre-configured channel characteristic hypothesis; a pre-configured channel characteristic hypothesis of an $A^{th}$-type packet index associated with the low-priority information element; or a pre-configured channel characteristic hypothesis of a third-type packet index or a second-type packet index associated with the low-priority information element.

(2) The specific channel characteristic hypothesis includes at least one of the following: a channel characteristic hypothesis associated with a preset index that satisfies a first predetermined condition and is associated with the low-priority information element; a channel characteristic hypothesis of a primary cell or a primary carrier associated with the low-priority information element; a channel characteristic hypothesis associated with a preset index, which satisfies a first predetermined condition, in preset indexes satisfying a third predetermined condition, where the preset indexes satisfying the third predetermined condition include a preset index associated with an $A^{th}$-type packet associated with the low-priority information element; a channel characteristic hypothesis of a primary carrier associated with an $A^{th}$-type packet associated with the low-priority information element; a channel characteristic hypothesis associated with a preset index, which satisfies the first predetermined condition, in preset indexes satisfying a fourth predetermined condition, where the preset indexes satisfying the fourth predetermined condition include a preset index associated with a second-type packet associated with the low-priority information element; or a channel characteristic hypothesis associated with a preset index, which satisfies the first predetermined condition, in preset indexes satisfying a fifth predetermined condition, where the preset indexes satisfying the fifth predetermined condition include a preset index associated with a third-type packet associated with the low-priority information element.

The preset index satisfying the first predetermined condition includes one of the following: lowest N preset indexes, highest N preset indexes or specific N preset indexes.

The preset index includes at least one of the following: a carrier index, a bandwidth part index, a control resource set index, or a control channel resource index; and N is a positive integer greater than or equal to 1.

(3) The specific channel characteristic hypothesis includes at least one of the following: a channel characteristic hypothesis of the high-priority information element; a channel characteristic hypothesis of a first specific high-priority information element, where an $A^{th}$-type packet index associated with the first specific high-priority information element is the same as an $A^{th}$-type packet index associated with the low-priority information element; a channel characteristic hypothesis of a second specific high-priority information element, where a second-type packet index associated with the second specific high-priority information element is the same as a second-type packet index associated with the low-priority information element; or a channel characteristic hypothesis of a third specific high-priority information element, where a third-type packet index associated with the third specific high-priority information element is the same as a third-type packet index associated with the low-priority information element.

The number of information elements associated with a packet index T associated with the low-priority information element is greater than a third-type threshold; or the number of channel characteristic hypotheses associated with a packet index T associated with the channel characteristic hypothesis of the low-priority information element is greater than a third-type threshold; or the number of different channel characteristic hypotheses associated with a packet index T associated with the channel characteristic hypothesis of the low-priority information element is greater than a third-type threshold.

The packet index T may be at least one of the following: an $A^{th}$-type packet index, a second-type packet index or a third-type packet index.

(Four) A third-type parameter Z associated with the information element is greater that the fourth-type threshold.

In this case, the third-type parameter Z associated with the information element includes at least one of the following: the number or the maximum number of information elements of a same $A^{th}$-type packet of the second communication node, where the same $A^{th}$-type packet is associated with the information elements; the number or the maximum number of channel characteristic hypotheses of a same $A^{th}$-type packet of the second communication node, where the same $A^{th}$-type packet is associated with information elements; or the number or the maximum number of different channel characteristic hypotheses of a same $A^{th}$-type packet of the second communication node, where the same $A^{th}$-type packet is associated with information elements.

In this case, the specific channel characteristic hypothesis includes at least one of the following: a pre-configured channel characteristic hypothesis; a pre-configured channel characteristic hypothesis of an $A^{th}$-type packet associated with the low-priority information element; a channel characteristic hypothesis associated with a preset index satisfying a first predetermined condition, or a channel characteristic hypothesis of a primary carrier or a primary cell; a channel characteristic hypothesis associated with a preset index, which satisfies the first predetermined condition, in preset indexes satisfying a third predetermined condition, where the preset indexes satisfying the third predetermined condition include a preset index associated with an $A^{th}$-type packet associated with the low-priority information element; a channel characteristic hypothesis of a primary carrier associated with an $A^{th}$-type packet associated with the low-priority information element; a channel characteristic hypothesis of the high-priority information element; or a channel characteristic hypothesis of a first specific high-priority information element, where an $A^{th}$-type packet index associated with the first specific high-priority information element is the same as an $A^{th}$-type packet index associated with the low-priority information element.

The preset index satisfying the first predetermined condition includes one of the following: lowest N preset indexes, highest N preset indexes or specific N preset indexes.

The preset index includes at least one of the following: a carrier index, a bandwidth part index, a control resource set index, or a control channel resource index; and N is a positive integer greater than or equal to 1.

The number of information elements associated with a packet index R associated with the low-priority information element is greater than a fourth-type threshold; or the number of channel characteristic hypotheses associated with a packet index R associated with the channel characteristic hypothesis of the low-priority information element is greater than a fourth-type threshold; or the number of different channel characteristic hypotheses associated with a packet index R associated with the channel characteristic hypothesis of the low-priority information element is greater than a fourth-type threshold, where the packet index R may be an $A^{th}$-type packet index.

The specific channel characteristic hypotheses in the above four cases may be combined with each other, and are not limited to the above-mentioned cases, and the specific combination manner is not intended to limit the scope of the embodiments of the present disclosure, details of which are not repeated here.

In an embodiment of the present disclosure, according to the priority criterion, the at least one of the following is performed: replacing the channel characteristic hypothesis of the low-priority information element by the specific channel characteristic hypothesis, or receiving the low-priority information element by using the specific channel characteristic hypothesis; receiving the high-priority information element, or not receiving the low-priority information element; or removing the low-priority information element.

The received information element satisfies at least one of the following conditions: the number of different channel characteristic hypotheses of received information elements is not greater than a first-type threshold, or the number of channel characteristic hypotheses of received information elements is not greater than a first-type threshold, or the number of information elements is not greater than a first-type threshold; a first-type parameter associated with the received information element is not greater than a second-type threshold; a second-type parameter associated with the received information element is not greater than a third-type threshold; or a third-type parameter associated with the received information element is not greater than a fourth-type threshold.

In an embodiment of the present disclosure, the priority criterion may be one of the following:

(1) The priority criterion includes at least one of the following: a priority of a first specific data channel is higher than a priority of a control channel; a priority of a first specific data channel is higher than a priority of a downlink reference signal; a priority of a control channel is higher than a priority of a second specific data channel; a priority of a downlink reference signal is higher than a priority of a second specific data channel; a priority of a control channel is higher than a priority of a downlink reference signal; or a priority of a data channel in a slot aggregation is higher than a priority of a control channel, or a priority of a data channel in a multi-slot mode is higher than a priority of a control channel.

The first specific data channel includes a data channel having a scheduling offset not less than a first specific threshold, and the second specific data channel includes a data channel having a scheduling offset less than the first specific threshold.

(2) The priority criterion includes that a priority of a control channel is higher than a priority of a data channel.

(3) The priority criterion includes at least one of the following: a priority of an aperiodic reference signal is higher than a priority of a periodic reference signal, or a priority of a first specific aperiodic reference signal is higher than a priority of a periodic reference signal; a priority of an aperiodic reference signal is higher than a priority of a semi-persistent reference signal, or a priority of a first specific aperiodic reference signal is higher than a priority of a semi-persistent reference signal; or a priority of a semi-persistent reference signal is higher than a priority of a periodic reference signal.

The first specific aperiodic reference signal includes an aperiodic reference signal having a scheduling offset not less than a second specific threshold.

(4) The priority criterion includes at least one of the following: a priority of a first specific aperiodic reference signal is higher than a priority of a second specific aperiodic reference signal; a priority of a periodic reference signal is higher than a priority of scheduling a second specific aperiodic reference signal; or a priority of a semi-persistent reference signal is higher than a priority of a second specific aperiodic reference signal.

The first specific aperiodic reference signal includes an aperiodic reference signal having a scheduling offset not less than a second specific threshold, and the second specific aperiodic reference signal includes an aperiodic reference signal having a scheduling offset less than the second specific threshold.

(5) The priority criterion includes at least one of the following: determining a priority by a reference signal index; determining a priority by a control resource set index; determining a priority by a combination index of control resource sets; determining a priority by a sequence number or a type of a radio-network temporary identifier (RNTI); determining a priority by a bandwidth part index, a carrier index or a cell index; or determining a priority by channel qualities or a reporting sequence of reference signals in a channel state information report. Specifically, the higher the reporting sequence or the better the channel quality, the higher the priority; or the lower the reporting sequence or the worse the channel quality, the higher the priority. Further, the priority determined according to the index is represented as: the lower the index sequence number, the higher the priority; or the higher the index sequence number, the higher the priority.

(6) The priority criterion includes at least one of the following: a priority of a third specific data channel is higher than a priority of a fourth specific data channel; a priority of a fifth specific data channel is higher than a priority of a sixth specific data channel; a priority of a control channel in a primary cell or a primary carrier is higher than a priority of a control channel in a secondary cell or a secondary carrier, or a priority of a reference signal in a primary cell or a primary carrier is higher than a priority of a reference signal in a secondary cell or a secondary carrier; or a priority of a fourth specific data channel or a control channel or a reference signal in a secondary cell or a secondary carrier is higher than a priority of a fifth specific data channel.

The third specific data channel includes a first specific data channel in the primary cell or the primary carrier, the fourth specific data channel includes a first specific data channel in the secondary cell or the secondary carrier, the fifth specific data channel includes a second specific data channel in the primary cell or the primary carrier, the sixth specific data channel includes a second specific data channel in the secondary cell or the secondary carrier, the first specific data channel includes a data channel having a scheduling offset not less than a first specific threshold, and the second specific data channel includes a data channel having a scheduling offset less than the first specific threshold.

The method for transmitting the information element described in the above embodiments will be described below with specific examples, where the examples are not intended to limit the scope of the embodiments of the present disclosure.

Example One

It is assumed that a UE end supports group-based reporting, i.e. the group-based reporting is performed on a CSI reporting. In the CSI reporting, the group-based reporting is performed on the reported RS IDs, in which up to two reference signals may be received by the UE simultaneously. Based on capability information of a multi-antenna panel supported by the UE and capability information of a multi-antenna panel supported by a base station, the base station configures T1 information to the UE: the number T1=2 of different channel characteristic hypotheses of downlink information elements that the UE needs to receive simultaneously.

Figure 3:
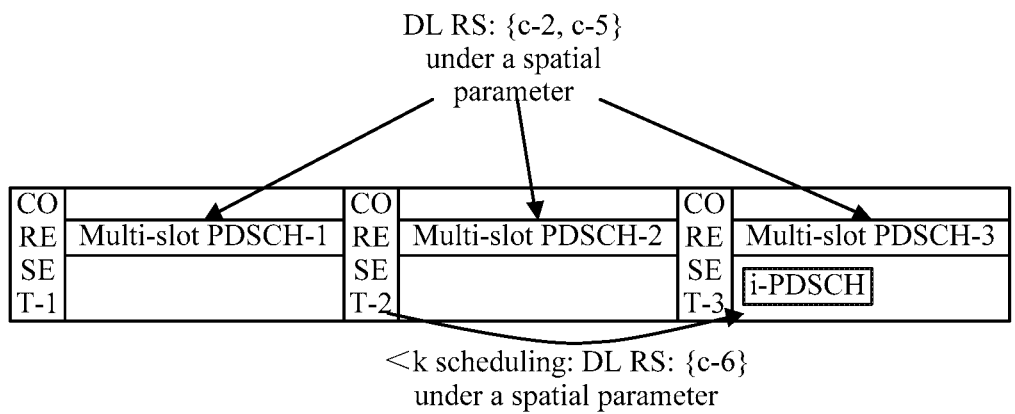
FIG. 3 is a schematic diagram of collisions occurring among channel characteristic hypotheses of physical downlink shared channels (PDSCHs) in example one according to an embodiment of the present disclosure.

FIG. 3 is a schematic diagram of collisions occurring among channel characteristic hypotheses of PDSCHs in example one according to an embodiment of the present disclosure. As shown in FIG. 3, the UE receives multi-slot PDSCHs, such as a slot-aggregation PDSCH, a DL RS under a spatial parameter associated with the PDSCHs is {c-2, c-5}, which is also called beam c-2 and beam c-5.

CORESET-2 schedules one i-PDSCH, where i-PDSCH represents that the scheduling offset of the PDSCH is less than a threshold k. That is, when the UE end receives i-PDSCH, the UE end does not realize that one i-PDSCH exists, that is, the UE end may perform receiving only by using an assumed beam. According a criterion, i-PDSCH needs to obey a channel characteristic hypothesis of CORESET-3, that is, the beam is c-6.

According to the assumption of T1=2, the number of different spatial parameters of i-PDSCH and multi-slot PDSCHs is 3, which is greater than T1, and channel characteristic hypotheses of multi-slot PDSCHs and a channel characteristic hypothesis of i-PDSCH collide, so that the channel characteristic hypothesis of the low-priority i-PDSCH is replaced by a specific channel characteristic hypothesis, that is, replaced by the channel characteristic hypotheses of high-priority multi-slot PDSCHs. Therefore, the channel characteristic hypothesis of i-PDSCH is rewritten as {c-2, c-5}.

Figure 4:
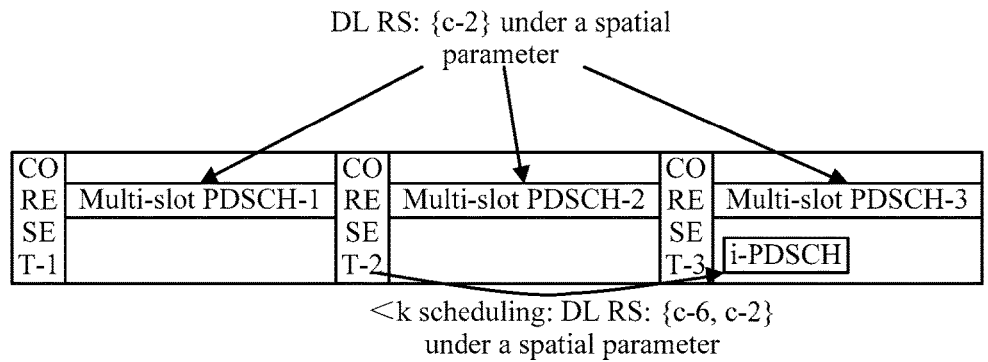
FIG. 4 is a schematic diagram of no collision occurring among channel characteristic hypotheses of PDSCHs in example one according to an embodiment of the present disclosure.

FIG. 4 is a schematic diagram of no collision occurring among channel characteristic hypotheses of PDSCHs in example one according to an embodiment of the present disclosure. As shown in FIG. 4, the UE receives multi-PDSCH, a DL RS under a spatial parameter associated with the multi-PDSCH is {c-2}, while CORESET-2 schedules one i-PDSCH, and a default beam of i-PDSCH, i.e. a DL RS under a spatial parameter associated with i-PDSCH is {c-6, c-2}.

On the whole, a beam associated with the multi-slot PDSCHs and i-PDSCH is {c-6, c-2}, which is not more than T1=2. Channel characteristic hypotheses of the multi-slot PDSCHs and a channel characteristic hypothesis of i-PDSCH do not collide. According to a criterion, in an overlapping part of the multi-slot PDSCHs and i-PDSCH, it is necessary to perform receiving according to a joint spatial parameter {c-6, c-2}; or the UE end may determine, according to multi-slot PDSCH={c-2} and i-PDSCH={c-6, c-2}, receive beams of the multi-slot PDSCHs and i-PDSCH, that is, both the multi-slot PDSCH={c-2} and i-PDSCH={c-6, c-2} are valid.

Example Two

When the UE reports capability information of a multi-antenna panel or multi-panel supported by the UE, the number R1 of $A^{th}$-type packets of the UE is 2, i.e. R1=2, where characteristics of the $A^{th}$-type packets are that information elements associated with different packets may be received simultaneously, and information elements having different channel characteristic hypotheses and associated with a same packet may not be received simultaneously. Therefore, for the UE, two UAG indexes are formed, and called as UAG-a and UAG-b respectively.

Figure 5:
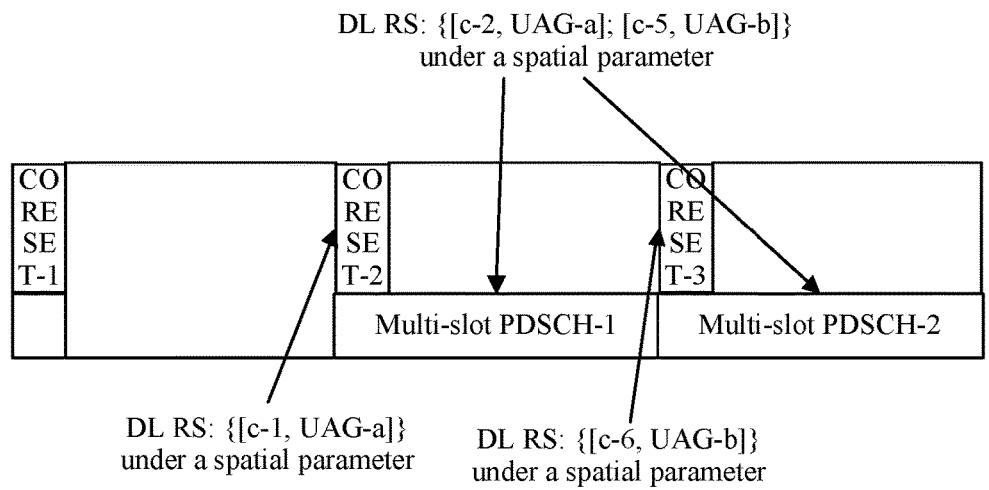
FIG. 5 is a schematic diagram of collisions occurring between channel characteristic hypotheses of PDSCHs and a channel characteristic hypothesis of a physical downlink control channel (PDCCH) in example two according to an embodiment of the present disclosure.

FIG. 5 is a schematic diagram of collisions occurring between channel characteristic hypotheses of PDSCHs and a channel characteristic hypothesis of a PDCCH in example two according to an embodiment of the present disclosure. As shown in FIG. 5, for a control channel PDCCH, a DL RS under a spatial parameter of CORESET-2 is configured as {[c-1, UAG-a]}, and a DLRS under a spatial parameter of CORESET-3 is configured as {[c-6, UAG-b]}. A multi-slot PDSCH includes two slots, and the DL RSs under the spatial parameters are {[c-2, UAG-a], [c-5, UAG-b]} respectively; moreover, a priority of the multi-slot PDSCH is higher than a priority of the PDCCH.

Criterion 1: a spatial parameter of a low-priority channel needs to be replaced as a spatial parameter of a high-priority channel with the same UAG index as the low-priority channel. Therefore, for the CORESET-2, a collision occurs in UAG-a, so the spatial parameter under the CORESET-2 only replace spatial parameter information under the same associated UAG. That is, from the prospective of the UE, the spatial parameter of the CORESET-2 is {[c-2, UAG-a]}. Similarly, the spatial parameter of the CORESET-3 is {[c-5, UAG-b]}.

Criterion 2: a low-priority channel is not monitored. Therefore, the CORESET-2 and CORESET-3 of the control channel will not be monitored by the UE end.

Example Three

When a UE reports capability information of a multi-antenna panel or multi-panel supported by the UE, the number R1 of $A^{th}$-type packets of the UE is 2, i.e. R1=2, and the number R2 of $B^{th}$ type packet under the $A^{th}$ type packets of the UE is 2, i.e. R2=2. Characteristics of the $A^{th}$-type packets are that information elements associated with different packets may be received simultaneously, and a same packet includes E $B^{th}$ type packets. Characteristics of the $B^{th}$-type packets are that information associated with different packets may be received simultaneously, and information elements having different channel characteristic hypotheses and associated with a same packet may not be received simultaneously.

Figure 6:
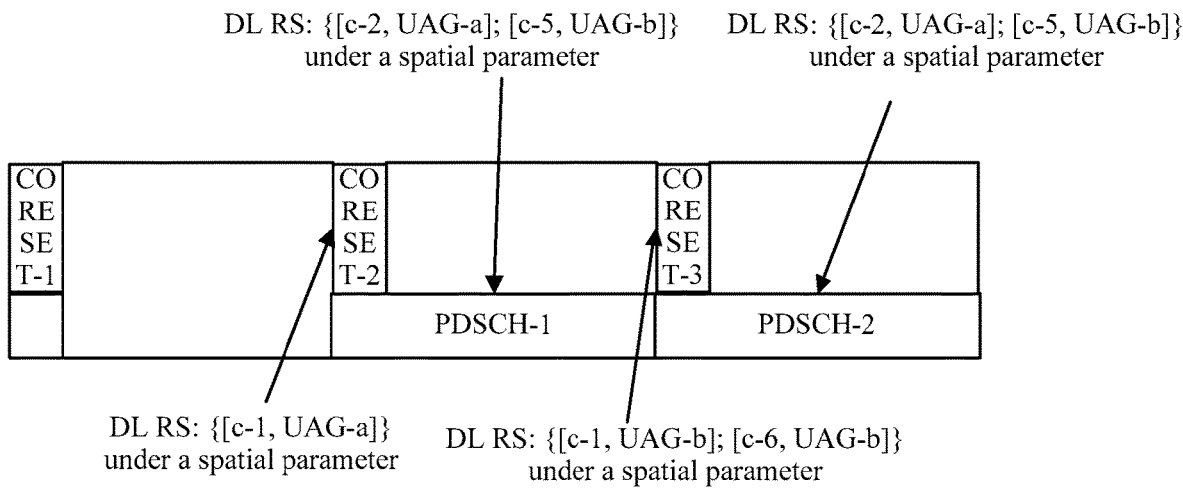
FIG. 6 is a schematic diagram of collisions occurring between channel characteristic hypotheses of PDSCHs and a channel characteristic hypothesis of a PDCCH in example three according to an embodiment of the present disclosure.

FIG. 6 is a schematic diagram of collisions occurring between channel characteristic hypotheses of PDSCHs and a channel characteristic hypothesis of a PDCCH in example three according to an embodiment of the present disclosure. For a control channel PDCCH, a DL RS under a spatial parameter of CORESET-2 is configured as {[c-1, UAG-a]}, and DL RSs under spatial parameters of CORESET-3 are configured as {[c-1, UAG-b]}, {[c-6, UAG-b]}. At the same time, transmissions of two PDSCHs are included, where DL RSs under spatial parameters of PDSCH-1 are {[c-2, UAG-a], [c-5, UAG-b]}, and, DL RSs under spatial parameters of PDSCH-2 also are {[c-2, UAG-a], [c-5, UAG-b]}. A priority of the PDSCH is higher than a priority of the PDCCH.

CORESET-2/PDSCH-1: since one UAG can support two $B^{th}$ type packets simultaneously, from the prospective of the UE, it is not considered that a collision occurs between the CORESET-2 and the PDSCH-1. In other words, both the CORESET-2 and the PDSCH-1 are received normally, and the specific receive beams is determined by the UE end.

CORESET-3/PDSCH-2: for UAG-b, there are Y1=3 different spatial parameters, which exceed the upper limit of R2=2, therefore, the spatial parameters of the UAG-b associated with the low-priority CORESET-3 are replaced by the spatial parameters of the UAG-b associated with the PDSCH. That is, the DL RS under the spatial parameter of the CORESET-3 is modified to {[c-5, UAG-b]}. Further, an entire QCL hypothesis or a TCI state of the CORESET-3 is modified to a TCI state of the UAG-b associated with the PDSCH.

Example Four

When a UE reports capability information of a multi-antenna panel or multi-panel supported by the UE, the number R1 of downlink reference signal resources and/or downlink channels received simultaneously is 2, i.e. R1=2, a base station end configures the number T1=2 of $A^{th}$ type packets of the base station, and the number T2 of $B^{th}$ type packets under the $A^{th}$ type packets of the base station.

Characteristics of the $A^{th}$-type packets are that information elements associated with different packets may be received simultaneously, and a same packet includes E $B^{th}$ type packets. Characteristics of the $B^{th}$-type packets are that information elements associated with different packets may be received simultaneously, and information elements having different channel characteristic hypotheses and associated with a same packet may not be received simultaneously.

Figure 7:
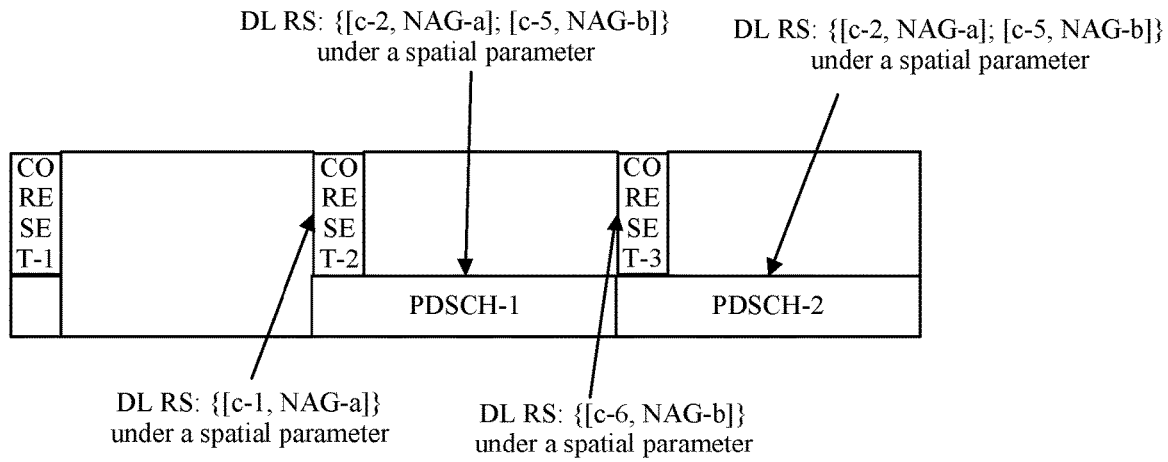
FIG. 7 is a schematic diagram of collisions between channel characteristic hypotheses of PDSCHs and a channel characteristic hypothesis of a PDCCH in the case of considering the number of transmission points (TRP)/panels at a base station end in example four of an embodiment of the present disclosure.

FIG. 7 is a schematic diagram of collisions between channel characteristic hypotheses of PDSCHs and a channel characteristic hypothesis of PDCCH in the case of considering the number of TRPs/panels at a base station end in example four of an embodiment of the present disclosure. As shown in FIG. 7, a DL RS under a spatial parameter of CORESET-2 is {[c-1, gNode Antenna Group-a (NAG-a)]}, a DL RS under a spatial parameter of CORESET-3 is {[c-6, NAG-b]}, and DL RSs under the spatial parameters of PDSCH-1 and PDSCH-2 are {[c-2, NAG-a], [c-5, NAG-b]}.

In the case of T2=1, for the CORESET-2, DL RSs under two spatial parameters are included under the NAG-a, and the DL RSs are c-1 and c-2 respectively, where Z=2 is greater than T2, the channel characteristics hypothesis of the PDSCH-1 and the channel characteristics hypothesis of the PDCCH collide. Therefore, according to the priority of the PDSCH being higher than the priority of the CORESET, from the prospective of the UE, the spatial parameter of the CORESET-2 is rewritten as {[c-2, UAG-a]}. Similarly, the spatial parameter of the CORESET-3 is rewritten as {[c-5, NAG-b]}.

In the case of T2=2, for the CORESET-2, DL RSs under two spatial parameters are included under the NAG-a, and the DL RSs are c-1 and c-2 respectively, where Z=2 is not greater than T2, the channel characteristics hypothesis of the PDSCH-1 and the channel characteristics hypothesis of the PDCCH do not collide. Therefore, from the prospective of the UE, the spatial parameter of the CORESET-2 is not replaced. Similarly, the spatial parameter of the CORESET-3 is also not replaced.

Example Five

Figure 8:
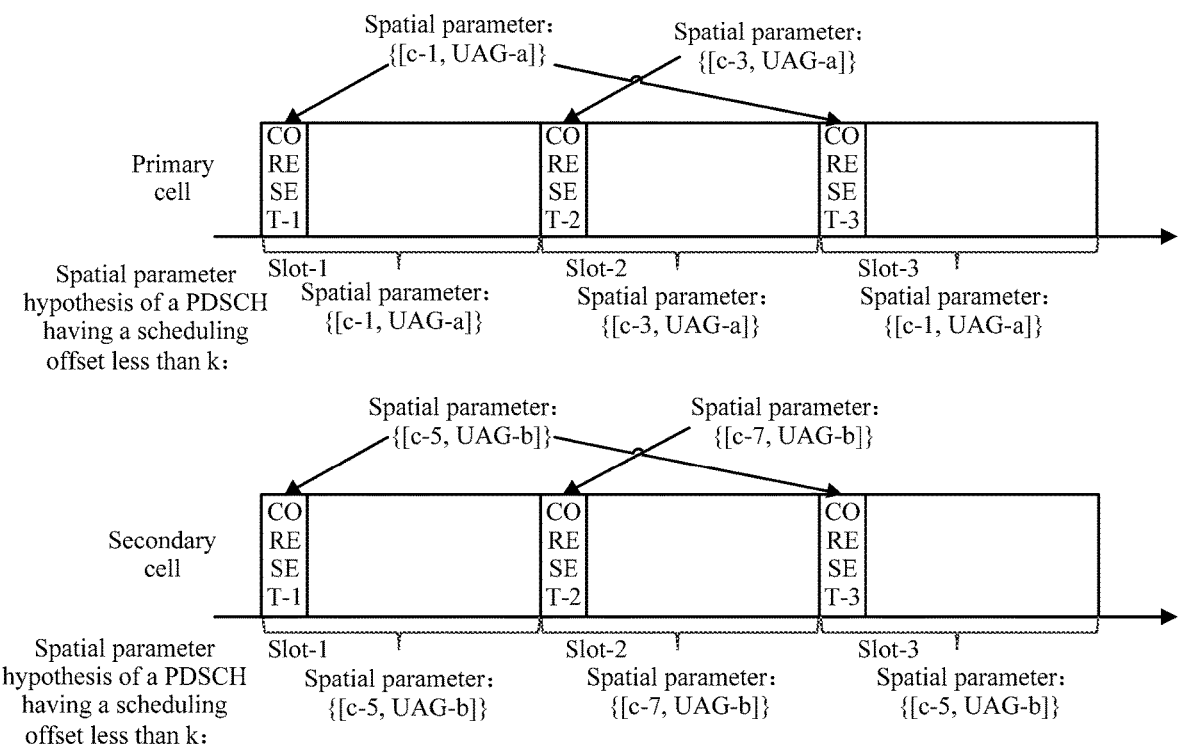
FIG. 8 is a schematic diagram of no collision occurring among channel characteristic hypotheses under a cross-component carrier (CC) in example five according to an embodiment of the present disclosure.

FIG. 8 is a schematic diagram of no collision occurring among channel characteristic hypotheses under a cross-CC in example five according to an embodiment of the present disclosure. As shown in FIG. 8, a UE reports capability information and the maximum number R1 of second-type packets in a channel state information is 2, i.e. R1=2, and the number T1 of $A^{th}$-type packets of a base station configured by the base station is 2, i.e. T1=2. Further, a channel characteristic hypothesis of the configured information element is received, where the channel characteristic hypothesis includes a UAG index and a reference signal index to determine whether to receive the information element.

Under a primary cell (Pcell), spatial parameters of CORESET-1 and CORESET-3 are {[c-2, UAG-a]}, and a spatial parameter of CORESET-2 is {[c-3, UAG-a]}. A QCL state of a PDSCH having a scheduling offset less than k=1 slot needs to obey a QCL state of the lowest CORESET ID of the nearest slot of the cell, i.e. a corresponding TCI state. Therefore, the spatial parameters of the PDSCHs having the scheduling offset of Slot-1 and Slot-3 less than k are {[c-1, UAG-a]}, and the spatial parameter of the PDSCH having the scheduling offset of Slot-2 less than k is {[c-3, UAG-a]}.

Under a secondary cell (Scell), the spatial parameters of the CORESET-1 and the CORESET-3 are {[c-5, UAG-b]}, and the spatial parameter of the CORESET-2 is {[c-7, UAG-b]}. The QCL state of the PDSCH having the scheduling offset less than k=1 slot needs to obey a QCL state of the lowest CORESET ID of the nearest slot of the cell, i.e. a corresponding TCI state. Therefore, the spatial parameters of the PDSCHs having the scheduling offset of Slot-1 and Slot-3 less than k are {[c-5, UAG-b]}, and the spatial parameter of the PDSCH having the scheduling offset of Slot-2 less than k is {[c-7, UAG-b]}.

Under slot-1 to slot-3, the number of spatial parameters within a same UAG group is not more than 1, so that from the prospective of the UE, no spatial parameter (or TCI state or QCL state) needs to be reconfigured.

Example Six

Figure 9:
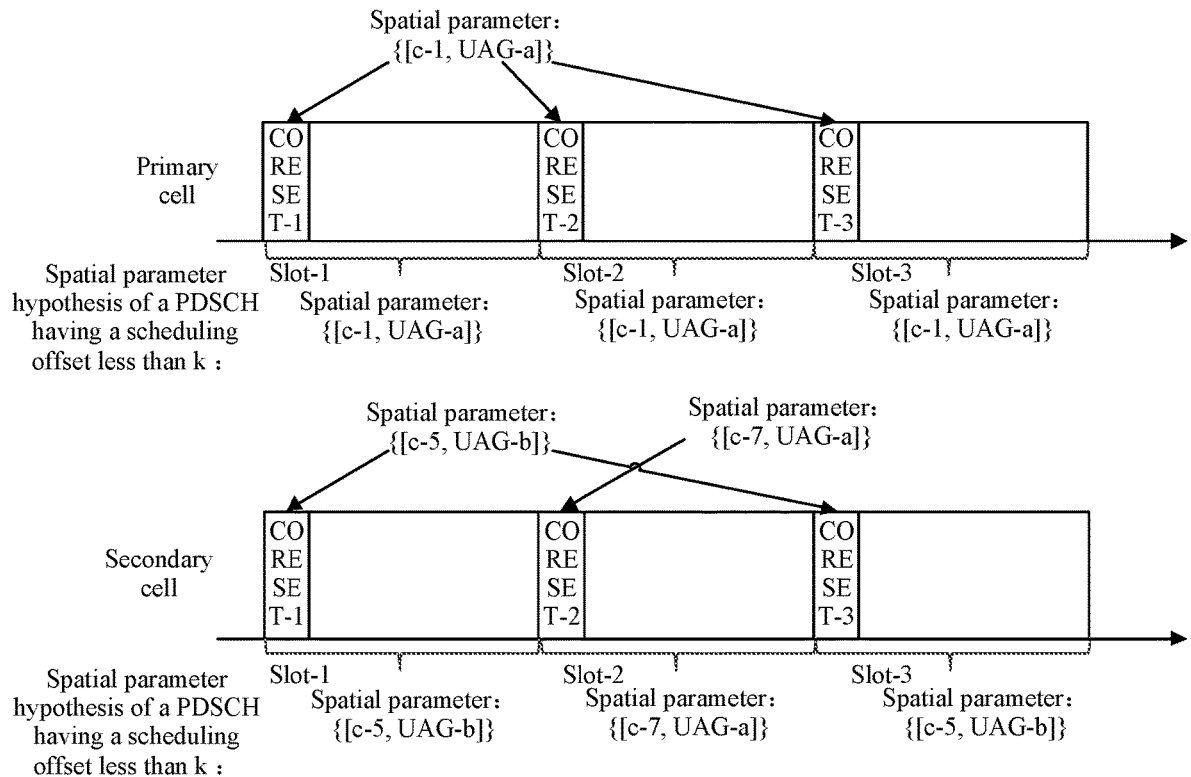
FIG. 9 is a schematic diagram of collisions occurring among channel characteristic hypotheses under a cross-CC in example six according to an embodiment of the present disclosure.

FIG. 9 is a schematic diagram of collisions occurring among channel characteristic hypotheses under a cross-CC in example six according to an embodiment of the present disclosure. A UE reports capability information, and the maximum number R1 of second-type packets in a channel state information report is 2, i.e. R1=2, the number T1 of $A^{th}$-type packets of a base station configured by the base station is 2, i.e. T1=2, and the number T2 of $B^{th}$-type packets of the $A^{th}$-type packets is 1, i.e. T2=1. Further, a channel characteristic hypothesis of the configured information element is received, where the channel characteristic hypothesis includes a UAG index and a reference signal index to determine whether to receive the information element.

Under a Pcell, spatial parameters of CORESET-1, CORESET-2 and CORESET-3 are {[c-1, UAG-a]}. A QCL state of a PDSCH having a scheduling offset less than k=1 slot needs to obey a QCL state of the lowest CORESET ID of the nearest slot of the Pcell, i.e. a corresponding TCI state. Therefore, spatial parameters of PDSCHs having the scheduling offsets of Slot-1, Slot-2 and Slot-3 less thank are {[c-1, UAG-a]}.

Under an Scell, the spatial parameters of the CORESET-1 and the CORESET-3 are {[c-5, UAG-b]}, and the spatial parameter of the CORESET-2 is {[c-7, UAG-a]}. A QCL state of a PDSCH having the scheduling offset less than k=1 slot needs to obey a QCL state of the lowest CORESET ID of the nearest slot of the Scell, i.e. a corresponding TCI state. Therefore, spatial parameters of PDSCHs having the scheduling offset of Slot-1 and Slot-3 less than k are {[c-5, UAG-b]}, and a spatial parameter of a PDSCH having the scheduling offset of Slot-2 less than k is {[c-7, UAG-a]}.

Under slot-1 and slot-3, the number of spatial parameters in a same UAG group is not more than 1, and from the prospective of the UE, no spatial parameter (or TCI state or QCL state) needs to be reconfigured.

However, for slot-2, the number of spatial parameters of the UAG-a is greater than 1, therefore, from the prospective of the UE, CORESET-2 and the spatial parameter of the PDSCH having the scheduling offset less than k under the Scell need to obey a corresponding CORESET and the spatial parameter of the PDSCH having the scheduling offset less than k under the Pcell respectively, that is, the spatial parameter {[c-7, UAG-a]} is rewritten as {[c-1, UAG-a]}.

In conclusion, based on the technical scheme provided by the embodiments of the present disclosure, according to the capability of receiving reference signals or channels simultaneously fed back by the UE end and restriction information, configured by a base station end, that may support sending reference signals or channels simultaneously, a method for processing collisions occurring among channel characteristic hypotheses under multiple beams sending or receiving simultaneously is specified, so as to improve the flexibility of system design, avoid too many restrictions on the configuration or scheduling of the base station end, and improve the resource utilization efficiency of beams or antenna panel at a transceiver end.

Figure 10:
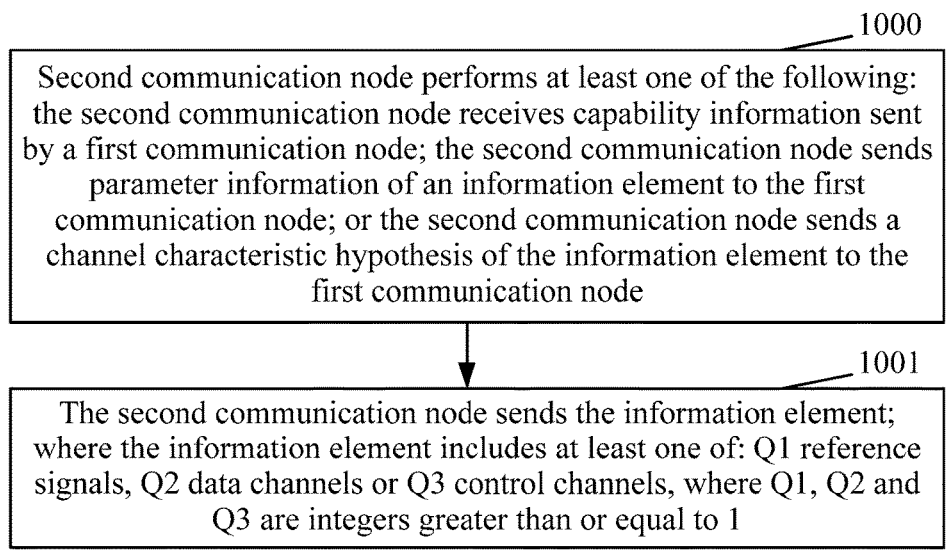
FIG. 10 is a flowchart of a method for transmitting an information element according to another embodiment of the present disclosure.

Referring to FIG. 10, another embodiment of the present disclosure provides a method for transmitting an information element, the method includes steps described below.

In step 1000, a second communication node performs at least one of the following: the second communication node receives capability information sent by a first communication node; the second communication node sends parameter information of an information element to the first communication node; or the second communication node sends a channel characteristic hypothesis of the information element to the first communication node.

In an embodiment of the present disclosure, the capability information includes at least one of the following: a first type of information, a second type of information or a third type of information.

The parameter information includes at least one of the following: a fourth type of information, or a fifth type of information.

The first type of information, the second type of information, the third type of information, the fourth type of information, and the fifth type of information are the same as those of the aforementioned embodiments and will not be repeated here.

In the embodiment of the present disclosure, the second communication node may determine the parameter information according to the capability information sent by the first communication node, and sends the parameter information to the first communication node. Specifically, the capability information may be taken as the parameter information. For example, when the capability information of the first communication node is that supporting a packet report, the capability of the first communication node obtained by the second communication node is that supporting signal transmissions of up to two different channel characteristic hypotheses (when the capability information of the first communication node is that not supporting the packet report, the capability of the first communication node is that supporting a signal transmission of only up to one different channel characteristic hypothesis by default), therefore, the number of demodulation reference signal port groups configured by the second communication node is 2.

The second communication node may do not determine the parameter information according to the capability information sent by the first communication node, which is not limited in the embodiment of the present disclosure.

In step 1001, the second communication node sends the information element, where the information element includes at least one of: Q1 reference signals, Q2 data channels or Q3 control channels, and Q1, Q2 and Q3 are integers greater than or equal to 1.

The embodiment of the present disclosure does not limit the manner of sending the information element, and the manner of sending the information element may be determined according to at least one of the following: the capability information, the parameter information, or the channel characteristic hypothesis of the information element, where the detailed method for determining the manner of sending the information element will not be repeated here; or the manner of sending the information element may not be determined according to at least one of the following: the capability information, the parameter information, or the channel characteristic hypothesis of the information element.

Figure 11:
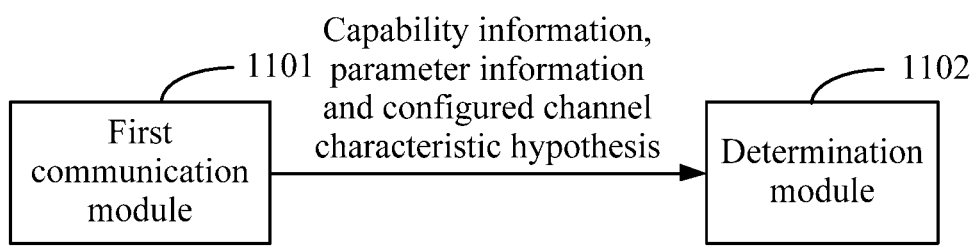
FIG. 11 is a schematic diagram of a structural composition of a communication node according to another embodiment of the present disclosure.

Referring to FIG. 11, another embodiment of the present disclosure provides a communication node, including a first communication module 1101 and a determination module 1102.

The first communication module 1101 is configured to perform at least one of the following: sending capability information to a second communication node; receiving parameter information of an information element configured by a second communication node; or receiving a channel characteristic hypothesis of the information element configured by the second communication node.

The determination module 1102 is configured to determine a manner of receiving the information element according to at least one of the following: the capability information, the parameter information, or the configured channel characteristic hypothesis of the information element.

The information element includes at least one of: Q1 reference signals, Q2 data channels or Q3 control channels, where Q1, Q2 and Q3 are integers greater than or equal to 1.

In an embodiment of the present disclosure, a characteristic of the information element include at least one of the following: transmitted simultaneously; sent by the second communication node simultaneously; received by the first communication node simultaneously; or associated with a same time unit, or the associated time units partially or completely overlap, where the same time unit includes at least one of the following: an OFDM symbol, a sub-OFDM symbol, or a slot.

In an embodiment of the present disclosure, the capability information includes at least one of the following: a first type of information, a second type of information or a third type of information.

In an embodiment of the present disclosure, the first type of information includes at least one of the following: the number of $A^{th}$-type packets; the number of $A^{th}$-type packets of the first communication node; the number or the maximum number of reference signals within a first-type packet in a channel state information report; the number or the maximum number of second-type packets in a channel state information report; the number or the maximum number of third-type packets in a channel state information report; the number or the maximum number of at least one of the following which is sent simultaneously: uplink reference signal resources or uplink channels; the number or the maximum number of at least one of the following which is received simultaneously: downlink reference signal resources or downlink channels; the number or the maximum number of channel characteristic hypotheses of at least one of the following which is received simultaneously: downlink reference signal resources or downlink channels; the number or the maximum number of different channel characteristic hypotheses of at least one of the following which is received simultaneously: downlink reference signal resources or downlink channels, or the number or the maximum number of downlink information elements having different channel characteristic hypotheses and received simultaneously; the number or the maximum number of channel characteristic hypotheses that may be configured by a reference signal resource or a reference signal resource set; the number or the maximum number of one of the following: reference signal resource sets, reference signal resource sets for a beam management, reference signal resource sets for a reference signal receiving power report, reference signal resource sets for a reference signal receiving quality report, reference signal resource sets for a signal to interference plus noise ratio report, or reference signal resource sets configured with repetition signaling; the number or the maximum number of demodulation reference signal port groups, or the number or the maximum number of demodulation reference signal port groups in a joint transmission mode; or the number or the maximum number of combinations of control resource sets of a physical downlink control channel.

In an embodiment of the present disclosure, the uplink reference signal includes at least one of the following: a sounding reference signal, a phase-tracking reference signal or a demodulation reference signal.

In an embodiment of the present disclosure, the downlink reference signal includes at least one of the following: a channel state information reference signal, a downlink phase-tracking reference signal, a synchronization signal block, a synchronization signal/physical broadcast channel, a downlink demodulation reference signal, or a channel state information reference signal for tracking.

In an embodiment of the present disclosure, the second type of information includes at least one of the following: the number of $B^{th}$-type packets under one $A^{th}$-type packet; the number of $B^{th}$-type packets under one $A^{th}$-type packet of the first communication node; or the number or the maximum number of reference signals, which are received simultaneously, within one third-type packet in a channel state information report.

In an embodiment of the present disclosure, the third type of information includes at least one of the following: capability information of receiving downlink information elements simultaneously; capability information of a multi-transmission node transmission mode, or capability information of a joint transmission mode, or capability information of a direct communication; capability information of a mode of multiple demodulation reference signal port groups; capability information of multiple combinations of control resource sets of physical downlink control channels; or capability information of a packet report.

In an embodiment of the present disclosure, the parameter information includes at least one of the following: a fourth type of information, or a fifth type of information.

In an embodiment of the present disclosure, the fourth type of information includes at least one of the following: the number of $A^{th}$-type packets; the number of $A^{th}$-type packets of the second communication node; the number or the maximum number of channel characteristic hypotheses of downlink information elements which are sent simultaneously, or the number or the maximum number of different channel characteristic hypotheses of downlink information elements which are sent simultaneously; the number or the maximum number of downlink information elements which are sent simultaneously, or the number or the maximum number of downlink information elements having different channel characteristic hypotheses and sent simultaneously; the number or the maximum number of downlink information elements which are processed simultaneously; the number or the maximum number of channel characteristic hypotheses associated with downlink information elements which are processed simultaneously; the number or the maximum number of different channel characteristic hypotheses of downlink information elements which are processed simultaneously; the number or the maximum number of downlink information elements having different channel characteristic hypotheses and processed simultaneously; the number or the maximum number of reference signals within a first-type packet in a channel state information report, or the number or the maximum number of reference signals, which are from a same reference signal resource set or in a same reference signal configuration, within a first-type packet in a channel state information report; the number or the maximum number of second-type packets in a channel state information report, or the number or the maximum number of second-type packets, which contain reference signals in a same reference signal resource set or in a same reference signal configuration, in a channel state information report; the number or the maximum number of third-type packets in a channel state information report, or the number or the maximum number of third-type packets, which contain reference signals in a same reference signal resource set or in a same reference signal configuration, in a channel state information report; the number or the maximum number of demodulation reference signal port groups, or the number or the maximum number of demodulation reference signal port groups in a joint transmission mode; the number or the maximum number of combinations of control resource sets of a physical downlink control channel; or the number of resource groups of a direct communication.

In an embodiment of the present disclosure, the above processed includes one of: received, monitored or measured.

In an embodiment of the present disclosure, a characteristic of the first-type packet includes at least one of the following: reference signals within the packet may be received simultaneously; or reference signals of packets may not be received simultaneously, or different reference signals of packets may not be received simultaneously.

In an embodiment of the present disclosure, a characteristic of the second-type packet includes at least one of the following: reference signals of packets may be received simultaneously; or reference signals within the packet may not be received simultaneously, or different reference signals with the packet may not be received simultaneously.

In an embodiment of the present disclosure, the fifth type of information includes at least one of the following: the number of $B^{th}$-type packets under one $A^{th}$-type packet, or the number of $B^{th}$-type packets under one $A^{th}$-type packet of the second communication node; or the number or the maximum number of reference signals, which are received simultaneously, within a third-type packet in a channel state information report, or the number or the maximum number of reference signals, which are from a same reference signal set or in a same reference signal configuration, within a third-type packet in a channel state information report.

In an embodiment of the present disclosure, a characteristic of the third-type packet includes at least one of the following: reference signals of packets may be received simultaneously; no more than F reference signals within the packet may be received simultaneously, or no more than F different reference signals within the packet may be received simultaneously; or more than F reference signals within the packet may not be received simultaneously, or more than F different reference signals within the packet may not be received simultaneously; where F is a positive integer greater than or equal to 1.

In an embodiment of the present disclosure, the $A^{th}$-type packet includes one of a panel or an antenna array. Further, the panel may also be referred as an antenna panel.

In an embodiment of the present disclosure, a characteristic of the $A^{th}$-type packet includes at least one of the following: information elements respectively associated with different packets may be sent simultaneously; information elements respectively associated with different packets may be received simultaneously; information elements associated with a same packet may not be sent simultaneously, or information elements having different channel characteristic hypotheses and associated with a same packet may not be sent simultaneously; or information elements associated with a same packet may not be received simultaneously, or information elements having different channel characteristic hypotheses and associated with a same packet may not be received simultaneously.

In an embodiment of the present disclosure, a characteristic of the $A^{th}$-type packet includes at least one of the following: no more than E information elements associated with a same packet may be sent simultaneously, or no more than E information elements having different channel characteristic hypotheses and associated with a same packet may be sent simultaneously; more than E information elements associated with a same packet may not be sent simultaneously, or more than E information elements having different channel characteristic hypotheses and associated with a same packet may not be sent simultaneously; no more than E information elements associated with a same packet may be received simultaneously, or no more than E information elements having different channel characteristic hypotheses and associated with a same packet may be received simultaneously; more than E information elements associated with a same packet may not be received simultaneously, or more than E information elements having different channel characteristic hypotheses and associated with a same packet may not be received simultaneously; or E $B^{th}$-type packets are included in the packet; where E is a positive integer greater than or equal to 1.

In an embodiment of the present disclosure, a characteristic of the $B^{th}$-type packet includes at least one of the following: information elements respectively associated with different packets may be sent simultaneously; information elements respectively associated with different packets may be received simultaneously; information elements associated with a same packet may not be sent simultaneously, or information elements having different channel characteristic hypotheses and associated with a same packet may not be sent simultaneously; or information elements associated with a same packet may not be received simultaneously, or information elements having different channel characteristic hypotheses and associated with a same packet may not be received simultaneously.

In an embodiment of the present disclosure, the channel characteristic hypothesis includes at least one of the following: a quasi co-location, a spatial parameter, a spatial quasi co-location, a transmission configuration indication state, spatial filter information, antenna group information or a reference RS set. Further, the channel characteristic hypothesis may be described by both the spatial parameter and the antenna group information.

In an embodiment of the present disclosure, the determination module 1102 is specifically configured to determine a manner of receiving the information element in the case where a preset condition is satisfied by at least one of the following: the capability information, the parameter information, or the channel characteristic hypothesis of the information element.

In an embodiment of the present disclosure, the determination module 1102 is specifically configured to, in the case where a preset condition is satisfied by at least one of the following: the capability information, the parameter information, or the channel characteristic hypothesis of the information element, perform, according to a priority criterion, at least one of the following: replacing a channel characteristic hypothesis of a low-priority information element by a specific channel characteristic hypothesis, or receiving a low-priority information element by using a specific channel characteristic hypothesis; receiving a high-priority information element, or not receiving a low-priority information element; or removing a low-priority information element.

In an embodiment of the present disclosure, the preset condition includes at least one of the following: the number of different channel characteristic hypotheses of information elements is greater than a first-type threshold, or the number of channel characteristic hypotheses of information elements is greater than a first-type threshold, or the number of information elements is greater than a first-type threshold; a first-type parameter associated with the information element is greater than a second-type threshold; a second-type parameter associated with the information element is greater than a third-type threshold; a third-type parameter associated with the information element is greater than a fourth-type threshold.

A third-type of information includes at least one of the following: supporting receiving downlink information elements simultaneously, supporting a multi-transmission node transmission mode, supporting a joint transmission mode, supporting a mode of multiple demodulation reference signal port groups, supporting a packet report, supporting a direct communication, or supporting combining control resource sets of multiple physical downlink control channels.

The first-type threshold or the second-type threshold or the third-type threshold or the fourth-type threshold is determined according to at least one of the capability information or the parameter information.

In an embodiment of the present disclosure, the first-type threshold or the second-type threshold or the third-type threshold or the fourth-type threshold includes at least one of the following: 1, 2, 3, 4, a first type of information, a second type of information, a fourth type of information, a fifth type of information, a product of a first type of information and a second type of information, or a product of a fourth type of information and a fifth type of information.

In an embodiment of the present disclosure, the first-type parameter includes the number of first-type packets associated with an information element, or the number of different first-type packet indexes associated with an information element.

In an embodiment of the present disclosure, the second-type parameter includes at least one of the following: the number or the maximum number of information elements of a same $A^{th}$-type packet index of the first communication node; the number or the maximum number of channel characteristic hypotheses of a same $A^{th}$-type packet index of the first communication node, where the same $A^{th}$-type packet index is associated with information elements; the number or the maximum number of different channel characteristic hypotheses of a same $A^{th}$-type packet index of the first communication node, wherein the same $A^{th}$-type packet index is associated with information elements; the number or the maximum number of information elements of a same second-type packet index, or the number or the maximum number of channel characteristic hypotheses of a same second-type packet index associated with information elements, or the number or the maximum number of different channel characteristic hypotheses of a same second-type packet index associated with information elements; or the number or the maximum number of information elements of a same third-type packet index, or the number or the maximum number of channel characteristic hypotheses of a same third-type packet index associated with information elements, or the number or the maximum number of different channel characteristic hypotheses of a same third-type packet index associated with information elements.

In an embodiment of the present disclosure, the third-type parameter associated with the information element includes at least one of the following: the number or the maximum number of information elements of a same $A^{th}$-type packet of the second communication node, where the same $A^{th}$-type packet is associated with the information elements; the number or the maximum number of channel characteristic hypotheses of a same $A^{th}$-type packet of the second communication node, where the same $A^{th}$-type packet is associated with information elements; or the number or the maximum number of different channel characteristic hypotheses of a same $A^{th}$-type packet of the second communication node, where the same $A^{th}$-type packet is associated with information elements.

In an embodiment of the present disclosure, the preset condition includes at least one of the following: the number of information elements is greater than a fifth-type threshold, or the number of different channel characteristic hypotheses of information elements is greater than a fifth-type threshold, or the number of channel characteristic hypotheses of information elements is greater than a fifth-type threshold; a third type of information including at least one of the following: not supporting receiving downlink information elements simultaneously, not supporting a multi-transmission node transmission mode, not supporting a joint transmission mode, not supporting a mode of multiple demodulation reference signal port groups, not supporting a packet report, not supporting a direct communication, or not supporting combing control resource sets of multiple physical downlink control channels; a third type of information being default or null; or a third type of information being not sent; where the fifth-type threshold includes at least one of: 1, 2, 3 or 4.

In an embodiment of the present disclosure, the number of information elements associated with a packet index associated with the low-priority information element is greater than a third-type threshold; or the number of channel characteristic hypotheses associated with a packet index associated with the channel characteristic hypothesis of the low-priority information element is greater than a third-type threshold; or the number of different channel characteristic hypotheses associated with a packet index associated with the channel characteristic hypothesis of the low-priority information element is greater than a third-type threshold.

In an embodiment of the present disclosure, the number of information elements associated with a packet index associated with the low-priority information element is greater than a fourth-type threshold; or the number of channel characteristic hypotheses associated with a packet index associated with the channel characteristic hypothesis of the low-priority information element is greater than a fourth-type threshold; or the number of different channel characteristic hypotheses associated with a packet index associated with the channel characteristic hypothesis of the low-priority information element is greater than a fourth-type threshold.

In an embodiment of the present disclosure, the specific channel characteristic hypothesis includes at least one of the following: a pre-configured channel characteristic hypothesis; a channel characteristic hypothesis associated with a preset index satisfying a first predetermined condition, or a channel characteristic hypothesis of a primary carrier; or a channel characteristic hypothesis of the high-priority information element.

The preset index satisfying the first predetermined condition includes one of the following: lowest N preset indexes, highest N preset indexes or specific N preset indexes.

The preset index includes at least one of the following: a carrier index, a bandwidth part index, a control resource set index, or a control channel resource index; where N is a positive integer greater than or equal to 1.

In an embodiment of the present disclosure, the specific channel characteristic hypothesis includes at least one of the following: a pre-configured channel characteristic hypothesis; a pre-configured channel characteristic hypothesis of a first-type packet index associated with the low-priority information element; a channel characteristic hypothesis associated with a preset index, which satisfies a first predetermined condition, in preset indexes satisfying a second predetermined condition; or a channel characteristic hypothesis of the high-priority information element.

The preset index satisfying the first predetermined condition includes one of the following: lowest N preset indexes, highest N preset indexes or specific N preset indexes.

The preset indexes satisfying the second predetermined condition include a preset index associated with a first-type packet index associated with the low-priority information element.

The preset index includes at least one of the following: a carrier index, a bandwidth part index, a control resource set index, or a control channel resource index; where N is a positive integer greater than or equal to 1.

In an embodiment of the present disclosure, the specific channel characteristic hypothesis includes at least one of the following: a pre-configured channel characteristic hypothesis; a pre-configured channel characteristic hypothesis of an $A^{th}$-type packet index associated with the low-priority information element; or a pre-configured channel characteristic hypothesis of a third-type packet index or a second-type packet index associated with the low-priority information element.

In an embodiment of the present disclosure, the specific channel characteristic hypothesis includes at least one of the following: a channel characteristic hypothesis associated with a preset index that satisfies a first predetermined condition and is associated with the low-priority information element; a channel characteristic hypothesis of a primary cell or a primary carrier associated with the low-priority information element; a channel characteristic hypothesis associated with a preset index, which satisfies a first predetermined condition, in preset indexes satisfying a third predetermined condition, where the preset index satisfying the third predetermined condition includes a preset index associated with an $A^{th}$-type packet associated with the low-priority information element; a channel characteristic hypothesis of a primary carrier associated with an $A^{th}$-type packet associated with the low-priority information element; a channel characteristic hypothesis associated with a preset index, which satisfies a first predetermined condition, in preset indexes satisfying a fourth predetermined condition, where the preset indexes satisfying the fourth predetermined condition include a preset index associated with a second-type packet associated with the low-priority information element; or a channel characteristic hypothesis associated with a preset index, which satisfies a first predetermined condition, in preset indexes satisfying a fifth predetermined condition, where the preset indexes satisfying the fifth predetermined condition include a preset index associated with a third-type packet associated with the low-priority information element.

The preset index satisfying the first predetermined condition includes one of the following: lowest N preset indexes, highest N preset indexes or specific N preset indexes.

The preset index includes at least one of the following: a carrier index, a bandwidth part index, a control resource set index, or a control channel resource index; where N is a positive integer greater than or equal to 1.

In an embodiment of the present disclosure, the specific channel characteristic hypothesis includes at least one of the following: a channel characteristic hypothesis of the high-priority information element; a channel characteristic hypothesis of a first specific high-priority information element, where an $A^{th}$-type packet index associated with the first specific high-priority information element is the same as an $A^{th}$-type packet index associated with the low-priority information element; a channel characteristic hypothesis of a second specific high-priority information element, where a second-type packet index associated with the second specific high-priority information element is the same as a second-type packet index associated with the low-priority information element; or a channel characteristic hypothesis of a third specific high-priority information element, where a third-type packet index associated with the third specific high-priority information element is the same as a third-type packet index associated with the low-priority information element.

In an embodiment of the present disclosure, the specific channel characteristic hypothesis includes at least one of the following: a pre-configured channel characteristic hypothesis; a pre-configured channel characteristic hypothesis of an $A^{th}$-type packet associated with the low-priority information element; a channel characteristic hypothesis associated with a preset index satisfying a first predetermined condition; or a channel characteristic hypothesis of a primary carrier or a primary cell; a channel characteristic hypothesis associated with a preset index, which satisfies a first predetermined condition, in preset indexes satisfying a third predetermined condition, where the preset indexes satisfying the third predetermined condition include a preset index associated with an $A^{th}$-type packet associated with the low-priority information element; a channel characteristic hypothesis of a primary carrier associated with an $A^{th}$-type packet associated with the low-priority information element; a channel characteristic hypothesis of the high-priority information element; or a channel characteristic hypothesis of a first specific high-priority information element, where an $A^{th}$-type packet index associated with the first specific high-priority information element is the same as an $A^{th}$-type packet index associated with the low-priority information element.

The preset index satisfying the first predetermined condition includes one of the following: lowest N preset indexes, highest N preset indexes or specific N preset indexes.

The preset index includes at least one of the following: a carrier index, a bandwidth part index, a control resource set index, or a control channel resource index; where N is a positive integer greater than or equal to 1.

In an embodiment of the present disclosure, according to the priority criterion, the at least one of the following is performed: replacing the channel characteristic hypothesis of the low-priority information element by the specific channel characteristic hypothesis, or receiving the-low priority information element by using the specific channel characteristic hypothesis; receiving the high-priority information element, or not receiving the low-priority information element; or removing the low-priority information element.

The received information element satisfies at least one of the following conditions: the number of different channel characteristic hypotheses of received information elements is not greater than a first-type threshold, or the number of channel characteristic hypotheses of received information elements is not greater than a first-type threshold, or the number of information elements is not greater than a first-type threshold; a first-type parameter associated with the received information element is not greater than a second-type threshold; a second-type parameter associated with the received information element is not greater than a third-type threshold; or a third-type parameter associated with the received information element is not greater than a fourth-type threshold.

In an embodiment of the present disclosure, the priority criterion includes at least one of the following: a priority of an aperiodic reference signal is higher than a priority of a periodic reference signal, or a priority of a first specific aperiodic reference signal is higher than a priority of a periodic reference signal; a priority of an aperiodic reference signal is higher than a priority of a semi-persistent reference signal, or a priority of a first specific aperiodic reference signal is higher than a priority of a semi-persistent reference signal; or a priority of a semi-persistent reference signal is higher than a priority of a periodic reference signal.

The first specific data channel includes a data channel having a scheduling offset not less than a first specific threshold, and the second specific data channel includes a data channel having a scheduling offset less than the first specific threshold.

In an embodiment of the present disclosure, a priority criterion includes that a priority of a control channel is higher than a priority of a data channel.

In an embodiment of the present disclosure, the priority criterion includes at least one of the following: a priority of a first specific aperiodic reference signal is higher than a priority of a second specific aperiodic reference signal; a priority of a periodic reference signal is higher than a priority of scheduling a second specific aperiodic reference signal; or a priority of a semi-persistent reference signal is higher than a priority of a second specific aperiodic reference signal.

The first specific aperiodic reference signal includes an aperiodic reference signal having a scheduling offset not less than a second specific threshold.

In an embodiment of the present disclosure, the priority criterion includes at least one of the following: a priority of a first specific aperiodic reference signal is higher than a priority of a second specific aperiodic reference signal; a priority of a periodic reference signal is higher than a priority of scheduling a second specific aperiodic reference signal; or a priority of a semi-continuous reference signal is higher than a priority of a second specific aperiodic reference signal.

The first specific aperiodic reference signal includes an aperiodic reference signal having a scheduling offset not less than a second specific threshold, and the second specific aperiodic reference signal includes an aperiodic reference signal having a scheduling offset less than the second specific threshold.

In an embodiment of the present disclosure, the priority criterion includes at least one of the following: determining a priority by a reference signal index; determining a priority by a control resource set index; determining a priority by a combination index of control resource sets; determining a priority by a sequence number or a type of an RNTI; determining a priority by a bandwidth part index, a carrier index or a cell index; or determining a priority by channel qualities or a reporting sequence of reference signals in a channel state information report.

In an embodiment of the present disclosure, the priority criterion includes at least one of the following: a priority of a third specific data channel is higher than a priority of a fourth specific data channel; a priority of a fifth specific data channel is higher than a priority of a sixth specific data channel; a priority of a control channel in a primary cell or a primary carrier is higher than a priority of a control channel in a secondary cell or a secondary carrier; or a priority of a reference signal in a primary cell or a primary carrier is higher than a priority of a reference signal in a secondary cell or a secondary carrier; or a priority of a fourth specific data channel or a control channel or a reference signal in a secondary cell or a secondary carrier is higher than a priority of a fifth specific data channel.

The third specific data channel includes a first specific data channel in the primary cell or the primary carrier, the fourth specific data channel includes a first specific data channel in the secondary cell or the secondary carrier, the fifth specific data channel includes a second specific data channel in the primary cell or the primary carrier, the sixth specific data channel includes a second specific data channel in the secondary cell or the secondary carrier, the first specific data channel includes a data channel having a scheduling offset not less than a first specific threshold, and the second specific data channel includes a data channel having a scheduling offset less than the first specific threshold.

Figure 12:
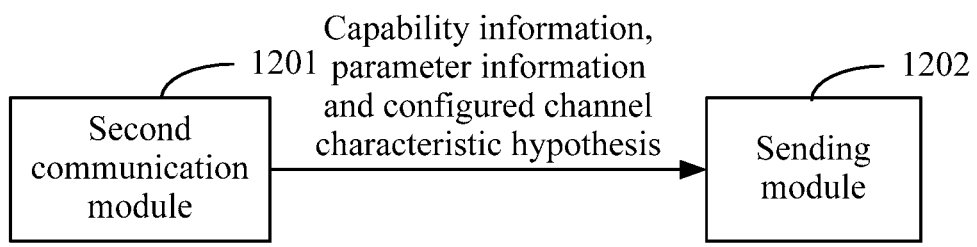
FIG. 12 is a schematic diagram of a structural composition of a communication node according to another embodiment of the present disclosure.

Referring to FIG. 12, another embodiment of the present disclosure provides a communication node, including a second communication module 1201 and a sending module 1202.

The second communication module 1201 is configured to perform at least one of the following: receiving capability information sent by a first communication node; sending parameter information of an information element to the first communication node; or sending a channel characteristic hypothesis of the information element to the first communication node.

The sending module 1202 is configured to send the information element.

The information element includes at least one of: Q1 reference signals, Q2 data channels or Q3 control channels, where Q1, Q2 and Q3 are integers greater than or equal to 1.

In an embodiment of the present disclosure, the capability information includes at least one of the following: a first type of information, a second type of information or a third type of information.

The parameter information includes at least one of the following: a fourth type of information, or a fifth type of information.

The first type of information, the second type of information, the third type of information, the fourth type of information, and the fifth type of information are the same as those of the aforementioned embodiments and will not be repeated here.

In an embodiment of the present disclosure, the second communication module 1201 may determine the parameter information according to the capability information sent by the first communication node, and sends the parameter information to the first communication node. Specifically, the capability information may be taken as the parameter information. For example, when the capability information of the first communication node is that supporting a packet report, the capability of the first communication node obtained by the second communication node is that supporting signal transmissions of up to two different channel characteristic hypotheses (when the capability information of the first communication node is that not supporting the packet report, the capability of the first communication node is that supporting a signal transmission of only up to one different channel characteristic hypothesis by default), therefore, the number of demodulation reference signal port groups configured by the second communication node is 2.

The second communication module 1201 may also not determine the parameter information according to the capability information sent by the first communication node, which is not limited in the embodiment of the present disclosure.

The specific implementation of the communication nodes are the same as that in the aforementioned embodiment, and will not be repeated here.

Another embodiment of the present disclosure provides a communication node, including a processor and a computer-readable storage medium, where the computer-readable storage medium stores an instruction, and the instruction, when executed by the processor, implements any one of the methods for transmitting the information element described above.

Another embodiment of the present disclosure further provides a computer-readable storage medium. The computer-readable storage medium stores a computer program, where the computer program, when executed by a processor, implements the steps of any one of the methods for transmitting the information element described above.

The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital video disk (DVD) or other optical disc storage, a magnetic cassette, a magnetic tape, a magnetic disk storage or other magnetic storage devices, or any other medium used for storing the desired information and accessible by a computer.

Figure 13:
FIG. 13 is a schematic diagram of a structural composition of a system for transmitting an information element according to another embodiment of the present disclosure.

Referring to FIG. 13, another embodiment of the present disclosure provides a system for transmitting an information element. The system includes a first communication node 1301 and a second communication node 1302.

The first communication node 1301 is configured to perform at least one of the following: sending capability information to a second communication node, receiving parameter information of an information element configured by a second communication node, or receiving a channel characteristic hypothesis of the information element configured by the second communication node; and determine a manner of receiving the information element according to at least one of the following: the capability information, the parameter information, or the channel characteristic hypothesis of the information element configured by the second communication node.

The second communication node 1302 is configured to perform at least one of the following: receiving the capability information sent by the first communication node, sending the parameter information of the information element to the first communication node, or sending the channel characteristic hypothesis of the information element to the first communication node; and send the information element.

The information element includes at least one of: Q1 reference signals, Q2 data channels or Q3 control channels, where Q1, Q2 and Q3 are integers greater than or equal to 1.

The specific implementations of the first communication node and the second communication node are the same as that in the above embodiment, and will not be repeated here.

The invention claimed is:

1. A wireless communication method comprising:
  receiving, by a first communication node, a channel characteristic hypothesis of a first aperiodic reference signal,
    wherein the channel characteristic hypothesis comprises a first quasi co-location (QCL); and
  receiving, by the first communication node, the first aperiodic reference signal according to a second QCL of a second aperiodic reference signal, of a periodic reference signal, or of a semi-persistent reference signal,
    wherein the first aperiodic reference signal has a scheduling offset less than a threshold, and
    wherein the second aperiodic reference signal has a scheduling offset not less than the threshold.

2. An apparatus comprising:
  a processor; and
  a memory including executable instructions that when executed by the processor perform operations comprising:
    receiving, by a first communication node, a channel characteristic hypothesis of a first aperiodic reference signal, wherein the channel characteristic hypothesis comprises a first quasi co-location (QCL); and receiving, by the first communication node, the first aperiodic reference signal according to a second QCL of a second aperiodic reference signal, of a periodic reference signal, or of a semi-persistent reference signal, wherein the first aperiodic reference signal has a scheduling offset less than a threshold, and wherein the second aperiodic reference signal has a scheduling offset not less than the threshold.

3. A non-transitory computer-readable medium including instructions that when executed by a processor perform operations comprising:

receiving, by a first communication node, a channel characteristic hypothesis of a first aperiodic reference signal, wherein the channel characteristic hypothesis comprises a first quasi co-location (QCL); and receiving, by the first communication node, the first aperiodic reference signal according to a second QCL of a second aperiodic reference signal, of a periodic reference signal, or of a semi-persistent reference signal, wherein the first aperiodic reference signal has a scheduling offset less than a threshold, and wherein the second aperiodic reference signal has a scheduling offset not less than the threshold.

* * * * *